(12) United States Patent
Kishigami et al.

(10) Patent No.: US 8,416,748 B2
(45) Date of Patent: Apr. 9, 2013

(54) RADIO COMMUNICATION SYSTEM, RADIO COMMUNICATION METHOD, BASE STATION DEVICE, AND TERMINAL DEVICE

(75) Inventors: Takaaki Kishigami, Tokyo (JP); Yoichi Nakagawa, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/568,571

(22) PCT Filed: Apr. 20, 2005

(86) PCT No.: PCT/JP2005/007524
§ 371 (c)(1),
(2), (4) Date: Nov. 2, 2006

(87) PCT Pub. No.: WO2005/114874
PCT Pub. Date: Dec. 1, 2005

(65) Prior Publication Data
US 2008/0008110 A1 Jan. 10, 2008

(30) Foreign Application Priority Data

May 20, 2004 (JP) ................................. 2004-150137
Mar. 28, 2005 (JP) ................................. 2005-092544

(51) Int. Cl.
*H04W 4/00* (2009.01)
(52) U.S. Cl. ........ 370/334; 375/147; 375/267; 375/347; 343/853
(58) Field of Classification Search .................. 370/334, 370/310, 208, 210, 329, 338, 341; 375/147, 375/267, E1.002, E1.02, 259, 285, 252, 224, 375/227, 260, 316, 347, 299; 343/853, 797; 342/361; 455/562.1
See application file for complete search history.

(56) References Cited

U.S. PATENT DOCUMENTS

| | | | |
|---|---|---|---|
| 6,351,499 B1 * | 2/2002 | Paulraj et al. | 375/267 |
| 6,687,492 B1 * | 2/2004 | Sugar et al. | 455/276.1 |
| 6,728,307 B1 * | 4/2004 | Derryberry et al. | 375/219 |
| 7,050,768 B2 * | 5/2006 | Hosur et al. | 455/103 |
| 2002/0191535 A1 * | 12/2002 | Sugiyama et al. | 370/208 |
| 2003/0035491 A1 * | 2/2003 | Walton et al. | 375/267 |
| 2003/0161384 A1 * | 8/2003 | Chun et al. | 375/130 |

(Continued)

FOREIGN PATENT DOCUMENTS

| | | |
|---|---|---|
| JP | 2001-211473 | 8/2001 |
| JP | 2002-84214 | 3/2002 |

(Continued)

OTHER PUBLICATIONS

Translation-Yoshitaka-Wireless_Transmitting_Apparatus_And_ Wireless_Receiving_Apparatus-JP_2002-261670.pdf.*

(Continued)

*Primary Examiner* — Charles Appiah
*Assistant Examiner* — Alexander Yi
(74) *Attorney, Agent, or Firm* — Seed IP Law Group PLLC

(57) ABSTRACT

A wireless communication system capable of removing a transmission signal to a different terminal space division multiplexed, an interference signal, in a terminal when wireless communications are conducted using space division multiple access is provided. A base station apparatus sends a notification of dedicated data transmission to a space division multiplexed terminal $MS_m$ and also sends a notification of information concerning a transmission beam used in a different terminal space division multiplexed and information concerning signal power used in the different terminal normalized in the terminal $MS_m$. Based on the sent information, each terminal $MS_m$ calculates interference cancel weight according to MMSE criterion as the weight to maximize SINR and a reception signal is multiplied by the obtained interference cancel weight for decreasing the interference component and then the signal is detected by maximum likelihood estimation based on information of signal constellation transmitted for receiving spatially multiple-transmitted signal.

7 Claims, 11 Drawing Sheets

U.S. PATENT DOCUMENTS

| | | | |
|---|---|---|---|
| 2004/0022205 A1* | 2/2004 | Miyata et al. | 370/319 |
| 2004/0028157 A1* | 2/2004 | Aoki et al. | 375/347 |
| 2004/0209579 A1* | 10/2004 | Vaidyanathan | 455/101 |
| 2005/0002467 A1* | 1/2005 | Seo et al. | 375/267 |
| 2005/0002468 A1* | 1/2005 | Walton et al. | 375/267 |

FOREIGN PATENT DOCUMENTS

| | | |
|---|---|---|
| JP | 2002-533010 | 10/2002 |
| JP | 2003-283466 | 10/2003 |

OTHER PUBLICATIONS

Foschini, "Layered Space-Time Architecture for Wireless Communication in a Fading Environment When Using Multi-Element Antennas", Bell Labs Technical Journal, 1996, pp. 41-59.

Ohgane et al., "A Study on a Channel Allocation Scheme with an Adaptive Array in SDMA", IEEE 47th VTC, vol. 2, 1997, pp. 725-729.

Telatar, "Capacity of Multi-antenna Gaussian Channels", vol. 10, No. 6, 1999, pp. 585-595.

Spencer et al., "Zero-Forcing Methods for Downlink Spatial Multiplexing in Multiuser MIMO Channels", IEEE Transactions on Signal Processing, vol. 52, No. 2, 2004, pp. 461-471.

Jalali et al., "Data Throughput of CDMA-HDR a High Efficiency-High Data Rate Personal Communication Wireless System", IEEE, 2000, pp. 1854-1858.

* cited by examiner

FIG. 6

| LIST NO. | NO. OF ELEMENTS | ARRANGEMENT | ELEMENT SPACING [CARRIER WAVELENGTH] | ANGLE RANGE [θs, θe] | ANGLE RESOLUTION Δθ [°] |
|---|---|---|---|---|---|
| 1 | 4 | LINEAR | 0.5 | ±60° | 10 |
| 2 | 8 | LINEAR | 0.5 | ±60° | 10 |
| 3 | 12 | LINEAR | 0.5 | ±60° | 10 |
| 4 | 4 | CIRCULAR | 0.42 | ±180° | 10 |
| 5 | 8 | CIRCULAR | 0.42 | ±180° | 10 |
| 6 | 12 | CIRCULAR | 0.42 | ±180° | 10 |
| ... | ... | ... | ... | ... | ... |

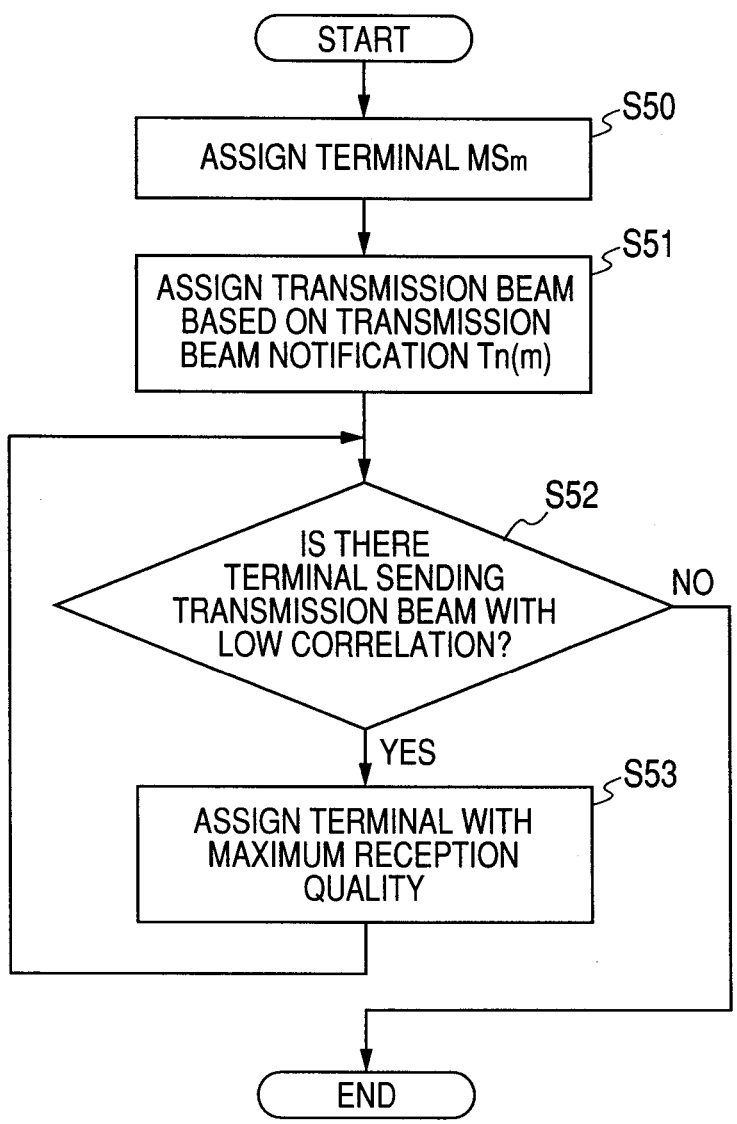

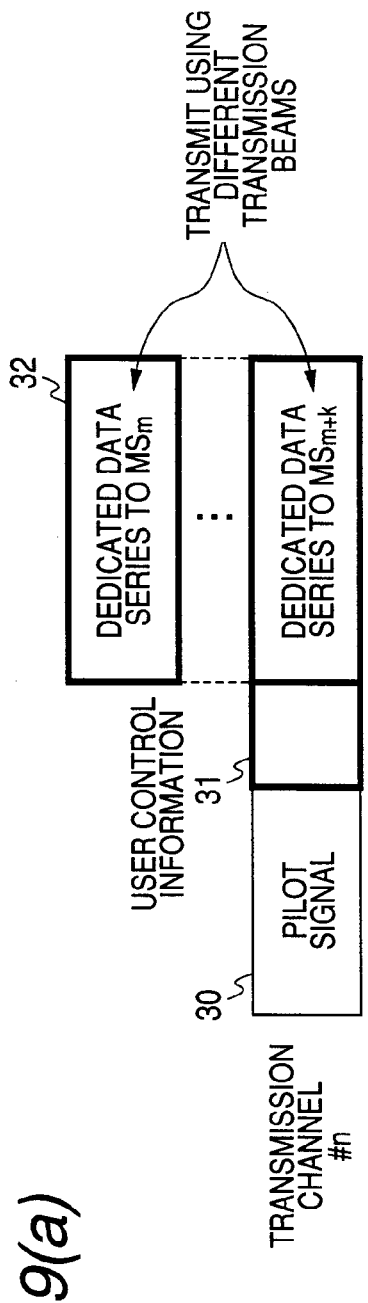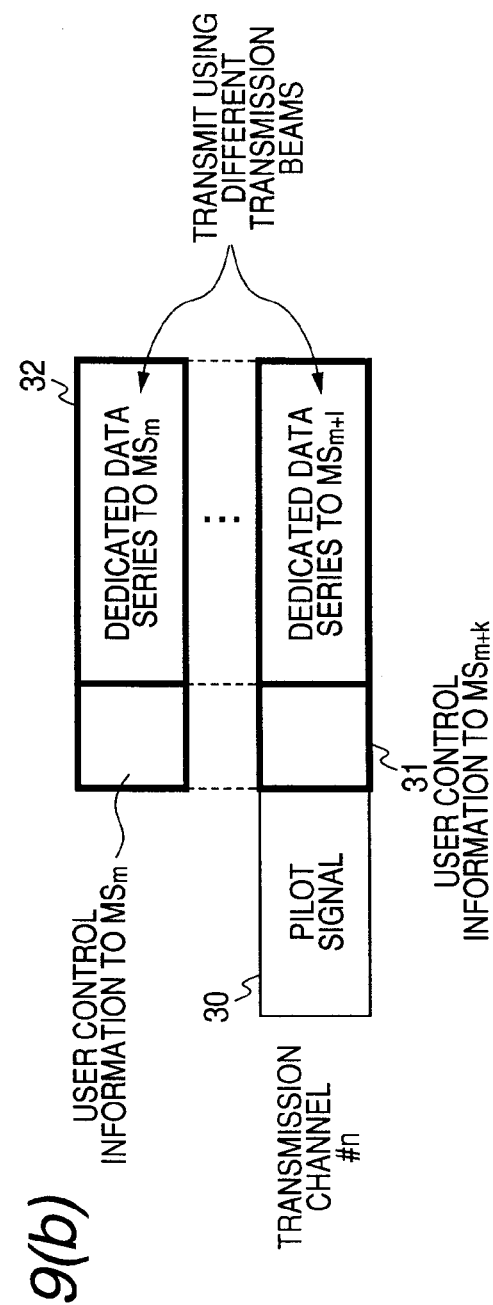
FIG. 9(a)
FIG. 9(b)

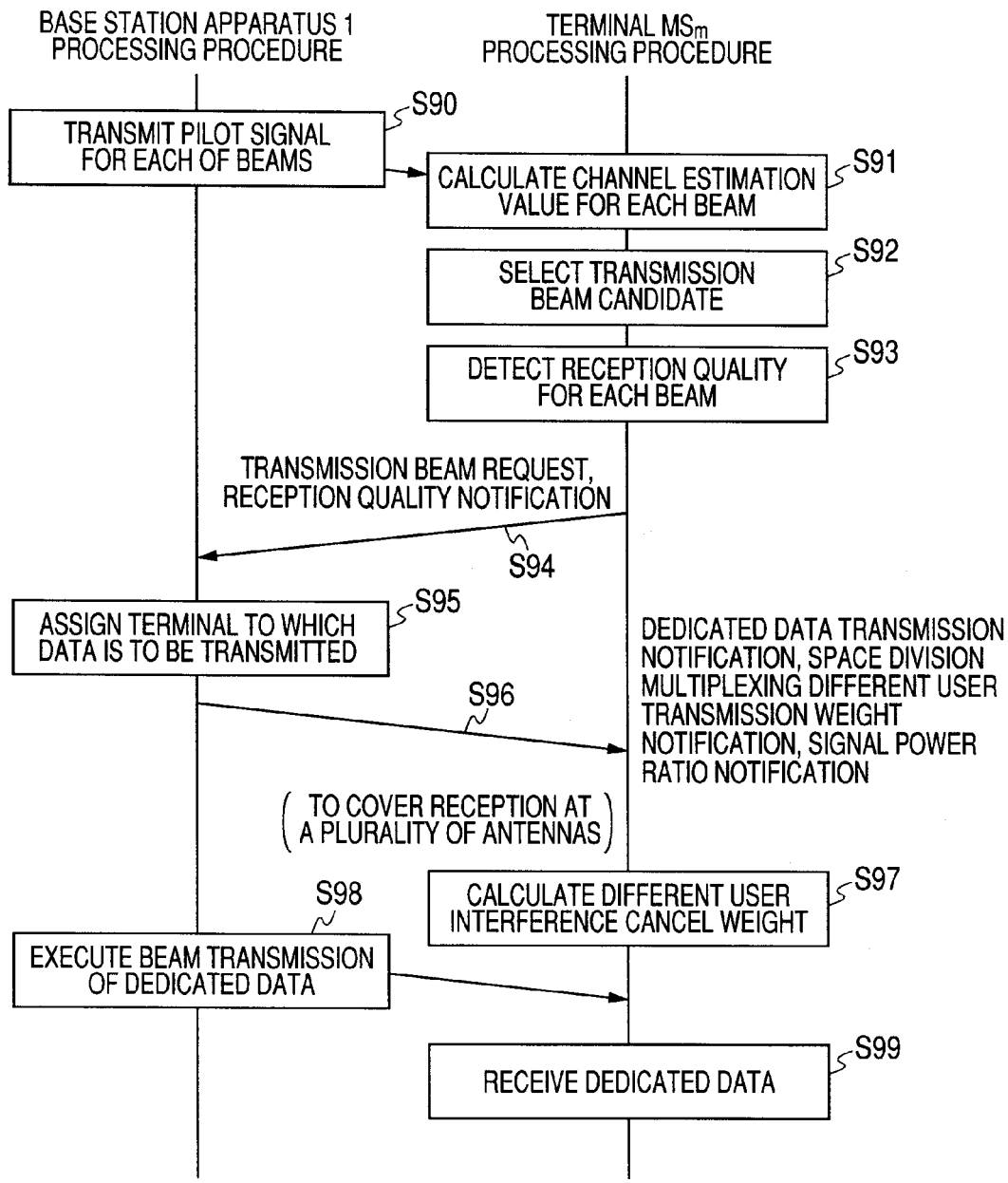

RADIO COMMUNICATION SYSTEM, RADIO COMMUNICATION METHOD, BASE STATION DEVICE, AND TERMINAL DEVICE

TECHNICAL FIELD

This invention relates to a wireless communication system, a wireless communication method, a base station apparatus, and a terminal for conducting wireless communications using space division multiple access.

BACKGROUND ART

In recent years, there have been growing demands for a large capacity and speeding up of wireless communications, and research on methods of improving the effective utilization factor of finite frequency resources have flourished. As one of the methods, attention is focused on a technique of using a spatial domain. An adaptive array antenna (adaptive antenna) is known as one of spatial domain use technologies. With the adaptive array antenna, a weighted coefficient by which a reception signal is multiplied is used to adjust the amplitude and the phase, whereby a signal coming from any desired direction is strongly received and the interference wave direction is suppressed. Accordingly, identical inter channel interference can be decreased and the communication capacity of a wireless communication system can be improved.

Known as other spatial domain use technologies are space division multiple access (SDMA) of transmitting different data series to different terminals and space division multiplexing (SDM) of transmitting different data series to the same terminal using physical channel at the identical time, at the same frequency, and of the same code using spatial orthogonality in a propagation line. If the spatial correlation coefficient between terminals is smaller than a predetermined value, the SDMA technology can be used for improving the throughput and the number of simultaneously accommodated users of a wireless communication system (refer to non-patent document 1).

On the other hand, in the SDM technology, a transmitter and a receiver are provided each with a plurality of antenna elements and SDM transmission is realized in a propagation environment wherein the reception signal correlation between antennas is low (refer to non-patent document 2). In this case, the transmitter transmits different data series using physical channel at the identical time, at the same frequency, and of the same code for each antenna element from the attached antennas. The receiver separates and receives the different data series from the reception signal through the attached antennas. Thus, a plurality of space division multiplex channels are used, whereby speeding up can be accomplished without using a multilevel modulation. To execute SDM transmission, in an environment wherein a large number of scatterers exist between the transmitter and the receiver under a sufficient S/N (signal-to-noise ratio) condition, if the number of antennas of the transmitter and that of the receiver are the same, the channel capacity can be expanded in proportion to the number of the antennas.

Multiuser MIMO (Multiple Input Multiple Output) technology is known as a technology provided by fusing the SDMA technology and the SDM technology (refer to non-patent document 3). The multiuser MIMO technology makes possible space division multiplexing transmission and space division multiple access based on directivity under a condition that the channel matrix of a terminal connected at the same time by way of space division multiplexing is already known in the transmitter. The channel matrix is represented as a channel vector in a terminal including only a single antenna, but is handled as a general channel matrix.

Non-patent document 1: T. Ohgane et al, "A study on a channel allocation scheme with an adaptive array in SDMA," IEEE 47th VTC, vol. 2, 1997, p. 725-729

Non-patent document 2: G. J. Foschini, "Layered space-time architecture for wireless communication in a fading environment when using multi-element antennas," Bell Labs Tech. J, Autumn 1996, p. 41-59

Non-patent document 3: Q. Spencer et al, "Zero-Forcing Methods for Downlink Spatial Multiplexing in Multiuser MIMO channels," IEEE Trans SP, Vol. 52, No. 2, 2004, p. 461-471

DISCLOSURE OF THE INVENTION

Problems that the Invention is to Solved

However, the wireless communication system using the space division multiple access (SDMA) in the related art described above involves the following problems: In the SDMA technology, to decrease interference between transmission signals to the connected terminals, the transmitting party needs to form transmission beams to spatially separate the terminals and thus the feedback amount of the channel estimation value from the receiver must be decreased in an FDD (Frequency Division Duplex) line. On the other hand, in a TDD (Time Division Duplex) line, it is not necessary to feed back the channel estimation value from the relativity of a propagation line under a sufficiently close condition in time, but a calibration circuit for correcting the deviation between branches of reception and transmission, usually contained in a plurality of array elements and a high-frequency circuit stage becomes necessary. To transmit under a condition that different terminal-to-terminal transmission beams are orthogonal to each other, the transmission beams are formed with priority given to the orthogonal condition and thus the array gain is impaired; this is a problem.

It is therefore an object of the invention to provide a wireless communication system, a wireless communication method, a base station apparatus, and a terminal capable of removing a transmission signal to a different terminal space division multiplexed, an interference signal, in a terminal when wireless communications are conducted using space division multiple access.

Means for Solving the Problems

The base station apparatus of the invention is a base station apparatus for conducting space division multiple access with a terminal in a downlink, the base station apparatus including space division multiplexing information notification means for sending space division multiplexing information concerning a different terminal as well as the terminal to the terminal; and dedicated data transmission means for executing dedicated data transmission using a transmission weight corresponding to each of the terminals based on the space division multiplexing information after the space division multiplexing information is sent.

Accordingly, when wireless communications are conducted using space division multiple access, the space division multiplexing information concerning not only the terminal, but also a different terminal space division multiplexed at the space division multiple access time is sent, whereby the transmission signal to the different terminal space division multiplexed, an interference signal, can be removed in the terminal. Accordingly, interference between the transmission beams from the base station apparatus to the different terminals is allowed, so that the flexibility of transmission beam formation is increased and it is made possible to improve the reception quality and the system capacity.

As one form of the invention, the above-described base station apparatus includes transmission weight generation means for generating the transmission weight used for the dedicated data transmission to the space division multiplexing terminal, wherein the space division multiplexing information includes information of the generated transmission weight.

As one form of the invention, in the above-described base station apparatus, one selected from among known transmission weight candidates is adopted as the transmission weight, and the space division multiplexing information includes information of the identification number of the selected transmission weight.

As one form of the invention, in the above-described base station apparatus, the space division multiplexing information includes information of transmission power to the terminal.

As one form of the invention, in the above-described base station apparatus, the space division multiplexing information includes information concerning the transmission format used for the dedicated data transmission to the terminal.

As one form of the invention, in the above-described base station apparatus, the space division multiplexing information includes information concerning at least one of modulation level and coding rate used for the dedicated data transmission to the terminal.

As one form of the invention, in the above-described base station apparatus, the space division multiplexing information includes information of a user dedicated pilot signal series transmitted to the terminal.

The invention of the terminal is a terminal for conducting space division multiple access with a base station apparatus in a downlink, the terminal including space division multiplexing information reception means for receiving space division multiplexing information concerning a different terminal space division multiplexed together with the terminal, sent from the base station apparatus; interference cancel means for decreasing the transmission signal component to the different terminal space division multiplexed based on the received space division multiplexing information; and dedicated data reception means for receiving a dedicated data signal addressed to the terminal, transmitted from the base station apparatus through the interference cancel means.

Accordingly, when wireless communications are conducted using space division multiple access, the space division multiplexing information concerning not only the terminal, but also a different terminal space division multiplexed at the space division multiple access time is received, whereby the transmission signal to the different terminal space division multiplexed, an interference signal, can be removed in the terminal. Accordingly, interference between the transmission beams from the base station apparatus to the different terminals is allowed, so that the flexibility of transmission beam formation is increased and it is made possible to improve the reception quality and the system capacity.

As one form of the invention, in the above-described terminal, if the terminal has a plurality of antennas, the interference cancel means generates a reception weight according to minimum square error criterion and the dedicated data reception means receives the signal provided by weighting the dedicated data signal addressed to the terminal by the reception weight based on maximum likelihood estimation.

Accordingly, if the terminal has a plurality of antennas, it is made possible to remove interference of the transmission signals from the base station apparatus to the different terminals based on the reception weight.

As one form of the invention, in the above-described terminal, the interference cancel means generates a candidate of transmission signal replica including an interference signal to the different terminal space division multiplexed and the dedicated data reception means receives the dedicated data signal addressed to the terminal based on maximum likelihood estimation using the generated candidate of transmission signal replica.

Accordingly, it is made possible to remove interference of the transmission signals from the base station apparatus to the different terminals based on the candidate of transmission signal replica including the interference signal to the different terminal.

As one form of the invention, in the above-described terminal, the space division multiplexing information includes information of a transmission weight used for dedicated data transmission to the terminal space division multiplexed, generated by the base station apparatus.

As one form of the invention, in the above-described terminal, the space division multiplexing information includes information of the identification number of the transmission weight selected from among known transmission weight candidates by the base station apparatus.

As one form of the invention, in the above-described terminal, the space division multiplexing information includes information of transmission power to the terminal.

As one form of the invention, in the above-described terminal, the space division multiplexing information includes information concerning the transmission format used for the dedicated data transmission to the terminal.

As one form of the invention, in the above-described terminal, the space division multiplexing information includes information concerning at least one of modulation level and coding rate used for the dedicated data transmission to the terminal.

As one form of the invention, in the above-described terminal, the space division multiplexing information includes information of a user dedicated pilot signal series transmitted to the terminal.

The wireless communication system of the invention is a wireless communication system for conducting space division multiple access in a downlink from a base station apparatus to a terminal, wherein the base station apparatus includes space division multiplexing information notification means for sending space division multiplexing information concerning a different terminal as well as the terminal to the terminal; and dedicated data transmission means for executing dedicated data transmission using a transmission weight corresponding to each of the terminals based on the space division multiplexing information after the space division multiplexing information is sent, and wherein the terminal includes space division multiplexing information reception means for receiving space division multiplexing information concerning a different terminal space division multiplexed together with the terminal, sent from the base station apparatus; interference cancel means for decreasing the transmission signal component to the different terminal space division multiplexed based on the received space division multiplexing information; and dedicated data reception means for receiving a dedicated data signal addressed to the terminal, transmitted from the base station apparatus through the interference cancel means.

Accordingly, when wireless communications are conducted using space division multiple access, the space division multiplexing information concerning not only the terminal, but also a different terminal space division multiplexed at the space division multiple access time is sent, whereby the transmission signal to the different terminal space division multiplexed, an interference signal, can be removed in the terminal. Accordingly, interference between the transmission beams from the base station apparatus to the different terminals is allowed, so that the flexibility of transmission beam formation is increased and it is made possible to improve the reception quality and the system capacity.

The wireless communication method of the invention is a wireless communication method for conducting space division multiple access in a downlink from a base station apparatus to a terminal, the wireless communication method including in the base station apparatus, a space division multiplexing information notification step of sending space division multiplexing information concerning a different terminal as well as the terminal to the terminal; and a dedicated data transmission step of executing dedicated data transmission using a transmission weight corresponding to each of the terminals based on the space division multiplexing information after the space division multiplexing information is sent, and in the terminal, a space division multiplexing information reception step of receiving space division multiplexing information concerning a different terminal space division multiplexed together with the terminal, sent from the base station apparatus; an interference cancel step of decreasing the transmission signal component to the different terminal space division multiplexed based on the received space division multiplexing information; and a dedicated data reception step of receiving a dedicated data signal addressed to the terminal, transmitted from the base station apparatus through the interference cancel step.

Accordingly, when wireless communications are conducted using space division multiple access, the space division multiplexing information concerning not only the terminal, but also a different terminal space division multiplexed at the space division multiple access time is sent, whereby the transmission signal to the different terminal space division multiplexed, an interference signal, can be removed in the terminal. Accordingly, interference between the transmission beams from the base station apparatus to the different terminals is allowed, so that the flexibility of transmission beam formation is increased and it is made possible to improve the reception quality and the system capacity.

The wireless communication method of the invention is a wireless communication method for conducting space division multiple access in a downlink from a base station apparatus to a terminal, the wireless communication method including in the base station apparatus, a space division multiplexing information notification step of sending space division multiplexing information concerning a different terminal as well as the terminal to the terminal; and a dedicated data transmission step of executing dedicated data transmission using a transmission weight corresponding to each of the terminals based on the space division multiplexing information after the space division multiplexing information is sent.

The wireless communication method of the invention is a wireless communication method for conducting space division multiple access in a downlink from a base station apparatus to a terminal, the wireless communication method including in the terminal, a space division multiplexing information reception step of receiving space division multiplexing information concerning a different terminal space division multiplexed together with the terminal, sent from the base station apparatus; an interference cancel step of decreasing the transmission signal component to the different terminal space division multiplexed based on the received space division multiplexing information; and a dedicated data reception step of receiving a dedicated data signal addressed to the terminal, transmitted from the base station apparatus through the interference cancel step.

As one form of the invention, in any of the above-described wireless communication methods, the space division multiplexing information includes information of a transmission weight used for dedicated data transmission to the terminal space division multiplexed, generated by the base station apparatus.

As one form of the invention, in any of the above-described wireless communication methods, the space division multiplexing information includes information of the identification number of the transmission weight selected from among known transmission weight candidates by the base station apparatus.

As one form of the invention, in any of the above-described wireless communication methods, the space division multiplexing information includes information of transmission power to the terminal.

As one form of the invention, in any of the above-described wireless communication methods, the space division multiplexing information includes information concerning the transmission format used for the dedicated data transmission to the terminal.

As one form of the invention, in any of the above-described wireless communication methods, the space division multiplexing information includes information concerning at least one of modulation level and coding rate used for the dedicated data transmission to the terminal.

As one form of the invention, in any of the above-described wireless communication methods, the space division multiplexing information includes information of a user dedicated pilot signal series transmitted to the terminal.

As one form of the invention, any of the above-described wireless communication methods includes, before the space division multiplexing information notification step, the steps of previously detecting the propagation channel state in the downlink and previously sending a notification of the transmission weight in the downlink for the terminal based on the propagation channel state by the terminal.

As one form of the invention, any of the above-described wireless communication methods includes, before the space division multiplexing information notification step, the steps of previously detecting the propagation channel state in the downlink, selecting the transmission weight in the downlink for the terminal from among weight candidates based on the propagation channel state, and previously sending a notification of the selected transmission weight to the base station apparatus by the terminal.

As one form of the invention, in the above-described wireless communication method, the step of selecting the transmission weight includes a step of selecting a predetermined number of transmission weight candidates with the maximum inner product with the right singular vector corresponding to singular values in a descending order of the singular values which is obtained by decomposing the channel matrix obtained as a result of detection of the propagation channel state.

As one form of the invention, any of the above-described wireless communication methods includes the steps of, before the space division multiplexing information notification step, previously detecting the propagation channel state in the downlink and sending reception quality information to the base station apparatus based on the propagation channel state by the terminal, and assigning the terminal to conduct space division multiple access in the down link based on the transmission weight and the reception quality information.

As one form of the invention, in the above-described wireless communication method, the step of assigning the terminal to conduct space division multiple access in the down link is a step of selecting the terminal with the best reception quality and assigning the selected terminal as the terminal to conduct space division multiple access if there are a plurality of transmission-possible terminals using a transmission weight whose correlation with a transmission weight for the terminal preferentially assigned is lower than a predetermined value.

Advantages of the Invention

According to the invention, there can be provided the wireless communication system, the wireless communication method, the base station apparatus, and the terminal capable of removing a transmission signal to a different terminal space division multiplexed, an interference signal, in a terminal when wireless communications are conducted using space division multiple access. Consequently, when the base station apparatus transmits a directional beam, it is made possible to form a transmission beam to allow interference between different terminals, so that the spatial flexibility in the transmission array antenna can be used to improve the communication quality; the transmission array gain can be improved, etc., and the system capacity of the downlink can be improved.

BRIEF DESCRIPTION OF THE DRAWINGS

FIG. 6 A drawing of a table previously listing information concerning the array configuration in the base station apparatus 1.

FIG. 8 A flowchart to show a terminal assignment processing procedure.

FIG. 9 A drawing to show frame structures for using space division multiplexing transmission of SDMA or SDM.

FIG. 10 A chart to show a processing procedure of a base station apparatus and different mth terminal in a second embodiment.

DESCRIPTION OF REFERENCE NUMERALS

Figure 1:
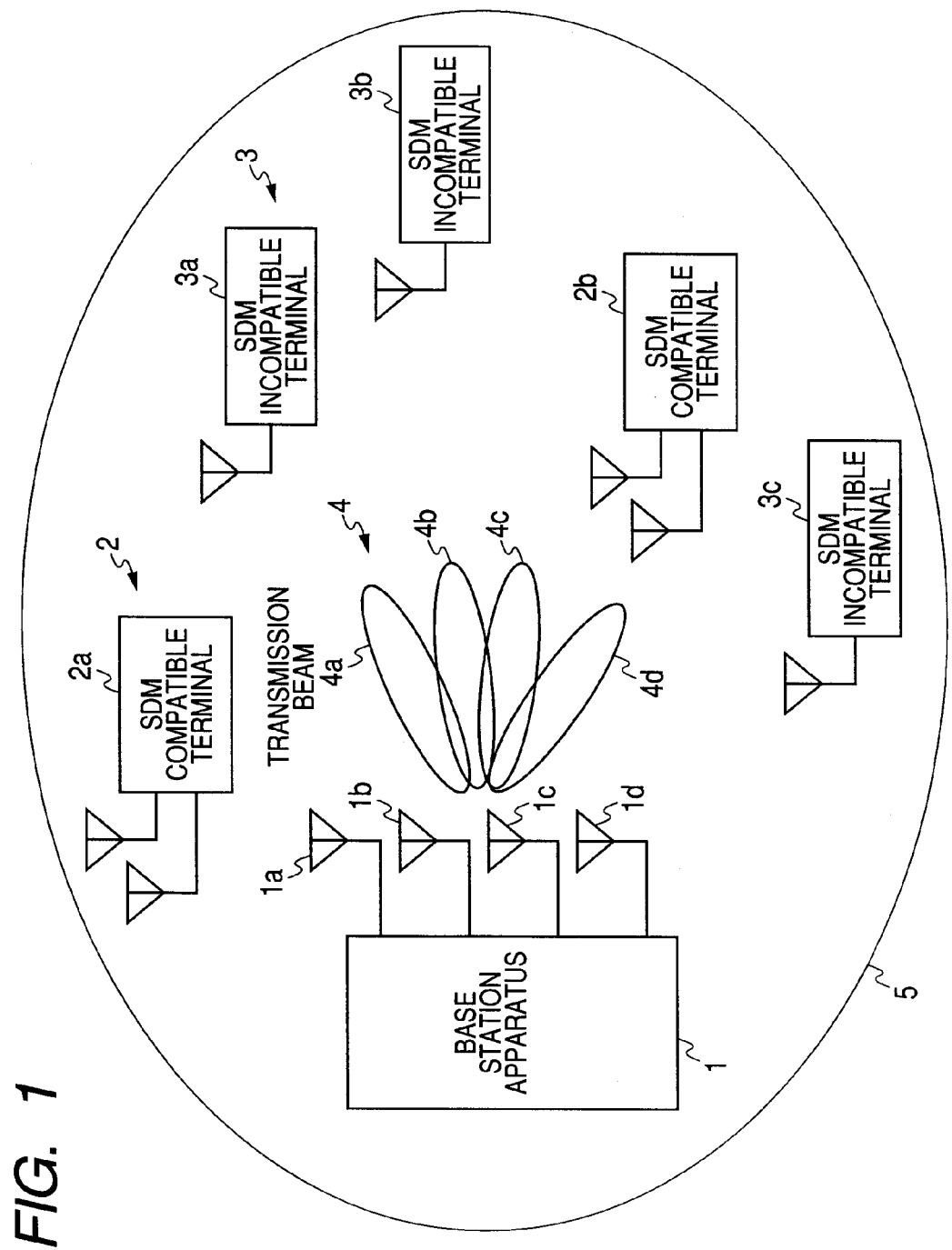
FIG. 1 A diagram to show the schematic configuration of a wireless communication system in a first embodiment.

1 Base station apparatus
2 SDM compatible terminal
3 SDM incompatible terminal
4 Transmission beam
5 Communication area
23 Terminal assignment means
24 Dedicated data transmission means
25 Space division multiplexing information notification means
42 Reception quality detection means
43 Channel state estimation means
44 Transmission weight selection means
45 Control information generation means
49 Spatial demultiplexing means
50, 60 Data extraction means

BEST MODE FOR CARRYING OUT THE INVENTION

First Embodiment

FIG. 1 is a diagram to show the schematic configuration of a wireless communication system according to a first embodiment of the invention. The embodiment shows communication processing using space division multiple access (SDMA) when transmission from a base station apparatus to a terminal (which will be hereinafter referred to as downlink) is performed. The wireless communication system is made up of a base station apparatus 1 and a plurality of terminals 2a, 2b, 3a, 3b, and 3c existing in a communication area 5 of the base station apparatus 1. The base station apparatus 1 has a plurality of antenna elements 1a to 1d and can change array antenna directivity adaptively. The base station apparatus 1 makes space division multiple access to an appropriate combination of the terminals 2a, 2b, 3a, 3b, and 3c existing in the communication area 5 from the antenna elements 1a to 1d and emits a plurality of transmission beams 4a, 4b, 4c, 4d (which will be hereinafter collectively called transmission beam 4), for example. The terminals 2a and 2b (which will be hereinafter collectively called terminal 2) are a plurality of SDM (Space Division Multiplexing) compatible terminals compatible with space division multiplexing transmission for spatially multiplexing a plurality of transmission signal series for the same terminal. The terminals 3a, 3b, and 3c (which will be hereinafter collectively called terminal 3) are a plurality of SDM incompatible terminals incompatible with SDM transmission.

The number of the SDM compatible terminals and that of the SDM incompatible terminals are not limited to them. The number of the transmission beams changes adaptively in response to the communication environment and an example of the number of the transmission beams is shown in FIG. 1. Here, the terminal numbered with the SDM compatible terminals 2 and the SDM incompatible terminals 3 mixed is represented as terminal $MS_m$. "m" is a natural number equal to or less than the number of terminals $N_{ms}$ existing in the communication area 5.

The wireless communication system enables space division multiple access to the terminals under circumstances where the SDM incompatible terminals 3 and the SDM compatible terminals 2 that can conduct communications are mixed in the communication area 5. The base station apparatus 1 determines whether or not both or either of SDM transmission and SDMA transmission is possible in the terminals made up of a large number of SDM compatible terminals 2 and SDM incompatible terminals 3 and forms a plurality of transmission beams 4 from the antenna elements of the base station apparatus 1, thereby realizing the SDM, SDMA transmission determined to be possible.

Figure 2:
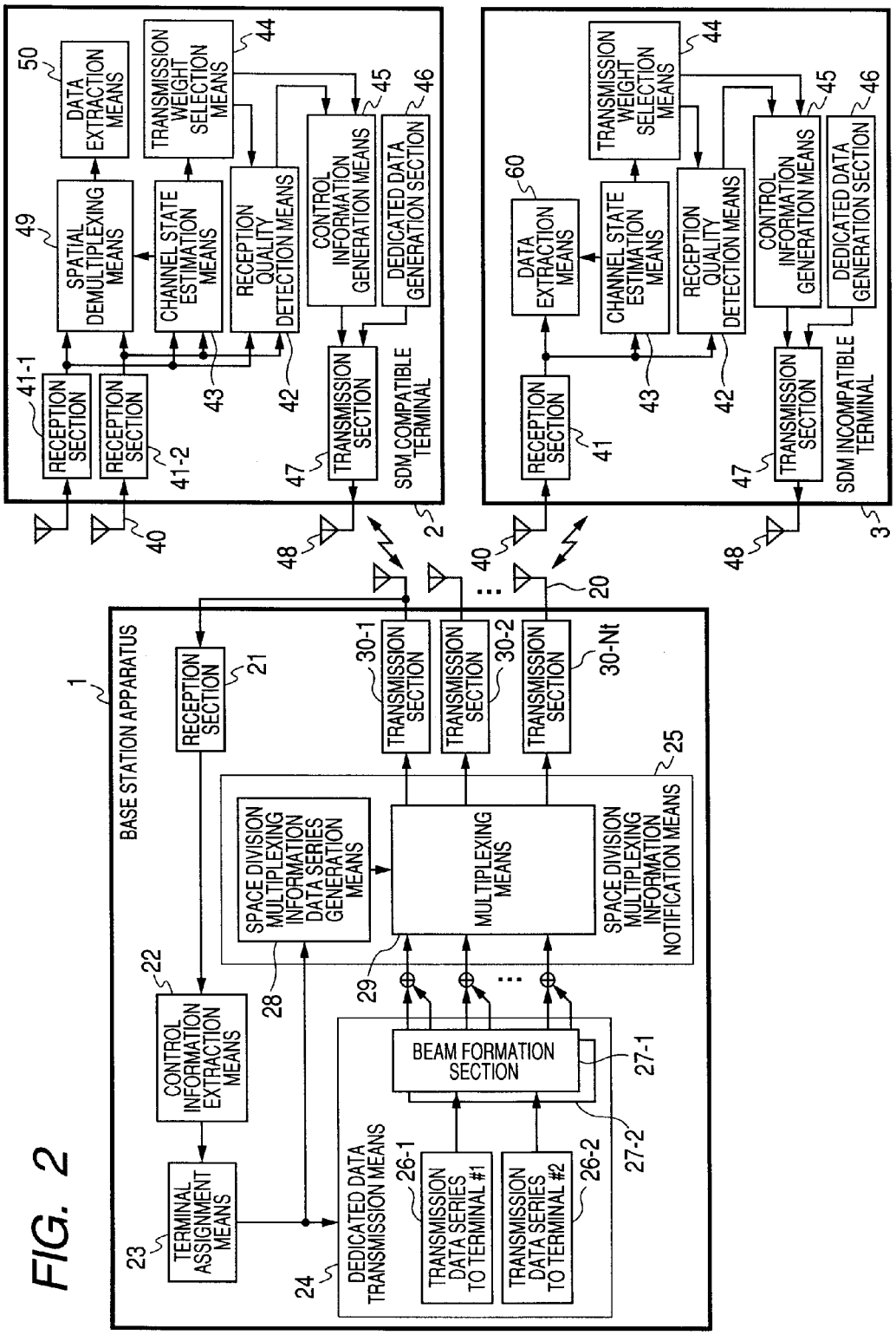
FIG. 2 A diagram to show the configurations of a base station apparatus and terminals in the first embodiment.

FIG. 2 is a diagram to show the configurations of the base station apparatus 1, the SDM compatible terminal 2 and the SDM incompatible terminal 3. In FIG. 2, the base station apparatus 1 has the following configuration. It has a plurality of base station antennas 20 for receiving and transmitting a high frequency signal, a reception section 21 for performing demodulation and decoding processing of the reception signal from the base station antennas 20, control information extraction means 22 for extracting control information sent from the terminal $MS_m$ from the decoded data, and terminal assignment means 23 for assigning the terminal to communicate based on output from the control information extraction means 22. The terminal assignment means 23 outputs connection information by way of space division multiplexing of the assigned terminal $MS_k$ to dedicated data transmission means 24 and space division multiplexing information notification means 25 where k=1 to s.

The dedicated data transmission means 24 multiplies transmission data series 26-1 to 26-2 generated based on a predetermined transmission format for the dedicated data to be transmitted to the terminal $MS_k$ assigned by the terminal assignment means 23 by a transmission weight in corresponding beam formation sections 27-1 to 27-s and then outputs. The space division multiplexing information notification means 25 has space division multiplexing information data series generation means 28 for generating data series to send the space division multiplexing information of the assigned terminal and multiplexing means 29 for multiplexing the generated space division multiplexing information data series into signal from the dedicated data transmission means 24. Transmission sections 30-1 to 30-Nt convert a baseband signal from the multiplexing means 29 into a high frequency signal of a carrier frequency band and output the high frequency signal through the base station antennas 20. FIG. 2 shows the configuration for executing SDMA transmission to two terminals #1 and #2 (s=2) by way of example. The multiplexing means 29 multiplexes the space division multiplexing information data series into dedicated data series using time division multiplexing, frequency division multiplexing, code division multiplexing, etc.

On the other hand, the SDM compatible terminal 2-m has reception antennas 40-1 to 40-Ns(m) for receiving a high frequency signal from the base station apparatus 1, reception sections 41-1 to 41-Ns(m) for converting the received high frequency signal into a baseband signal, reception quality detection means 42 for detecting the reception quality based on the received baseband signal or high frequency signal, channel state estimation means 43 for estimating a channel matrix as the channel state, and transmission weight selection means 44 for selecting an appropriate transmission weight based on the channel matrix. It also has control information generation means 45 for generating a data series in a predetermined format to be sent as control information to the transmission party and dedicated data generation section 46 for generating a dedicated data series for transmission based on a predetermined transmission format for the dedicated data to be transmitted to the base station apparatus 1. It also has a transmission section 47 for converting the output of control information generation means 45 of baseband signal and the output of the dedicated data generation section 46 into a high frequency signal of a carrier frequency band, a transmission antenna 48 for outputting the high frequency signal, spatial demultiplexing means 49 for demultiplexing and receiving any desired signal from the signal spatially multiplexed and transmitted to the home terminal or a different terminal based on the output of the channel state estimation means 43, and data extraction means 50 for extracting transmission data from the output signal from the spatial demultiplexing means 49. Incidentally, m is to uniquely number each SDM compatible terminal in the communication area 5 and represents a natural number equal to or less than a predetermined value. The reception antenna 40 and the transmission antenna 48 are handled as separate components, but may share the same antenna. A plurality of transmission antennas and a plurality of transmission sections may be provided for executing directional transmission.

Next, the configuration of the SDM incompatible terminal 3 is the same as that of the SDM compatible terminal 2 except that the spatial demultiplexing means 49 is not included and that data extraction means 60 operates in a different manner from the data extraction means 50 and therefore the configuration will not be discussed again. A reception antenna 40 and a transmission antenna 48 are handled as separate components, but may share the same antenna. Likewise, for the reception antenna 40 and a reception section 41, FIG. 2 shows the configuration of only one channel, but a plurality of channels may be provided for performing diversity reception for selecting or combining reception signals based on channel state estimation means 43.

Figure 3:
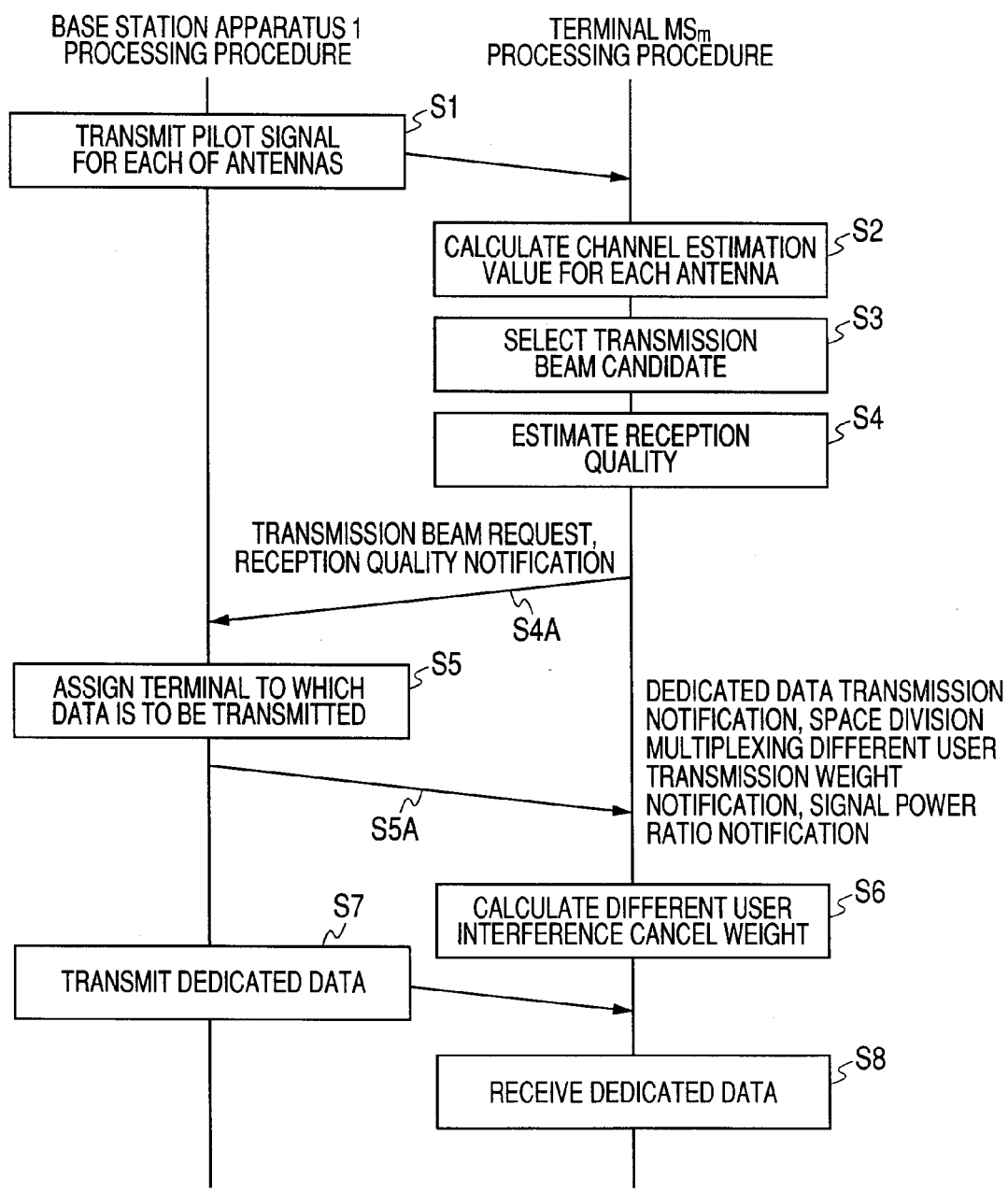
FIG. 3 A chart to show a communication processing procedure between the base station apparatus and the mth terminal.

FIG. 3 is a chart to show a communication processing procedure between the base station apparatus 1 and the mth terminal $MS_m$. FIG. 3 shows the operation after frame synchronization and symbol synchronization are established between the base station apparatus and the terminal, and does not show the synchronization establishing operation.

The base station apparatus 1 includes the $N_t$ base station antennas 20 and the transmission sections 30-1 to 30-Nt and first transmits a known signal series made up of a predetermined number of symbols $N_p$ (which will be hereinafter referred to as antenna dedicated pilot signal $AP_k(t)$) from each of the transmission sections (step S1). Here, k is the number of the antenna and the transmission section in the base station apparatus 1 and k=1, 2, . . . , $N_t$ where t=1, . . . , $N_p$. If the number of the antennas $N_t$ of the base station apparatus 1 is sufficiently large or if the number of spatial multiplex to execute SDM is limited to a value smaller than the number of the antennas $N_t$ of the base station apparatus 1, all $N_t$ transmission sections need not be used and only some of the transmission sections may be used to transmit antenna dedicated pilot signals.

Figure 4C:
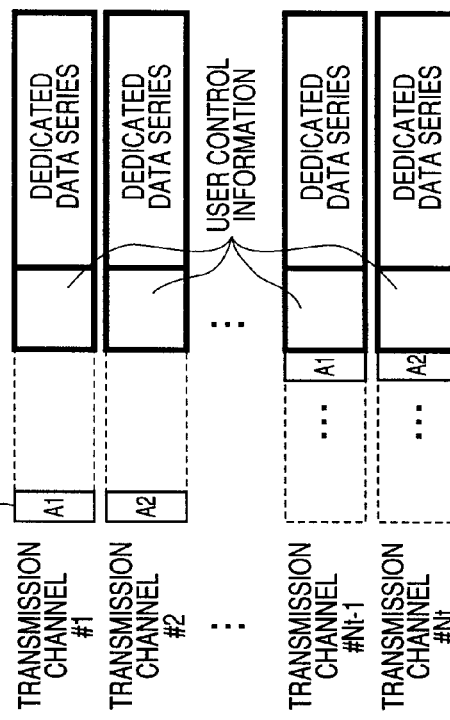
FIG. 4 A drawing to show the frame structure of each transmission signal from the base station apparatus containing an antenna dedicated pilot signal.
Figure 4A:
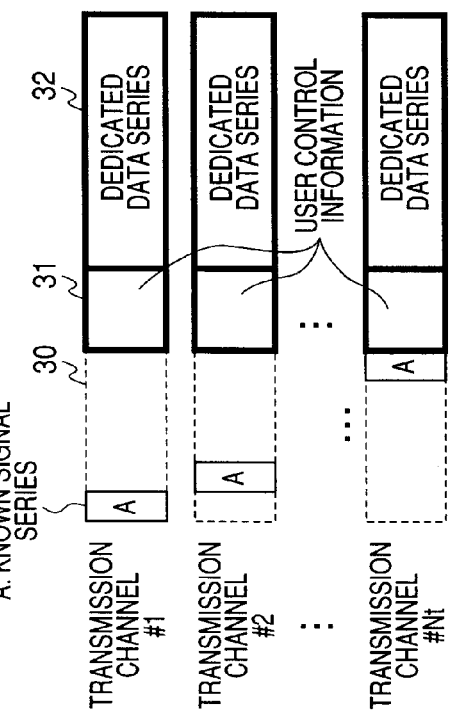
Figure 4B:
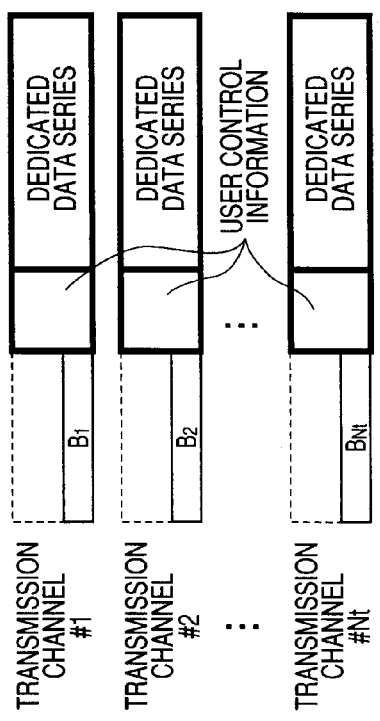

FIG. 4 is a drawing to show the frame structure of each transmission signal from the base station apparatus 1 containing an antenna dedicated pilot signal. The transmission signal in the frame is made up of an antenna dedicated pilot signal 30, user control information 31, and a dedicated data series 32. The user control information 31 stores user identification information of the destination of the dedicated data series 32 following the user control information and control information of the modulation scheme, the coding rate, etc., required for demodulating the dedicated data series 32.

FIGS. 4 (a), (b), and (c) show different transmission formats of the antenna dedicated pilot signal 30. In FIG. 4 (a), the transmission timing of the antenna dedicated pilot signal 30 is shifted for each antenna for transmission in a time division manner. Code series orthogonal to each other according to the same pattern, pseudo random code, etc., are used for the antenna dedicated pilot signal 30. In FIG. 4 (b), transmission is executed in a code division multiplexing manner using code series orthogonal to each other from different antennas.

A system using time division transmission and code division transmission in combination can also be applied. That is, in the antenna combination in FIG. 4 (c), the time division slot at the identical time is shared and the antenna dedicated pilot signals 30 (A1 and A2 in the figure) are transmitted in the code division multiplexing manner using code series orthogonal to each other. Accordingly, the overhead of time division transmission when the number of antennas is large in the base station apparatus 1 can be decreased and a decrease in the orthogonality in the propagation line at the code division multiplexing time can be relieved.

The terminal MSm existing in the communication area 5 calculates the channel estimation value of the antenna dedicated pilot signal $AP_k(t)$ transmitted for each base station antenna in the channel state estimation means 43 using the signals received at the reception antennas 40 and the reception sections 41-1 to 41-$N_s$ (step S2 in FIG. 3). Calculation of the channel estimation value is shown. The mth terminal $MS_m$ existing in the communication area 5 has N(m) antennas and N(m) reception channels and can execute SDM reception using a maximum of N(m) space division multiplex channels.

Here, "m" is a natural number equal to or less than the number of terminals $N_{ms}$ existing in the communication area 5. The mth SDM incompatible terminal 3 becomes $N_3(m)=1$, and the first SDM compatible terminal 2 becomes $N_s(1)>1$. For the kth antenna dedicated pilot signal $AP_k(t)$, correlation operation between the reception result at the jth antenna and reception channel in the mth terminal $MS_m$, $r_j, k^{(m)}(t)$ (where j=1, . . . , N(m)), and a replica of $AP_k(t)$ generated in the terminal $MS_m$ is performed as shown in expression (1), whereby the channel estimation value $h^m(j, k)$ of the propagation line is calculated. In the expression, * is an operator for executing a complex conjugate.

[Expression 1]

$$h^m(j, k) = \frac{1}{N_P} \sum_{t=1}^{N_P} AP_k^*(t) r_{j,k}^{(m)}(t) \quad (1)$$

The obtained channel estimation value $h^m(j, k)$ is represented as a channel matrix with j rows and k columns of elements as shown in expression (2). Here, in the mth SDM incompatible terminal 3, it is represented as $N_s(m)=1$, in which case channel matrix H(m) becomes a row vector.

[Expression 2]

$$H(m) = \begin{bmatrix} h^m(1, 1) & h^m(1, 2) & \ldots & h^m(1, N_t) \\ h^m(2, 1) & h^m(2, 2) & \ldots & h^m(2, N_t) \\ \vdots & \vdots & \vdots & \vdots \\ h^m(N_s(m), 1) & h^m(N_s(m), 2) & \ldots & h^m(N_s(m), N_t) \end{bmatrix} \quad (2)$$

Two or more reception results of the antenna dedicated pilot signal $AP_k(t)$ may be saved and averaging processing may be performed. In this case, if the move speed of the terminal is sufficiently small, the effect of noise can be decreased and it is made possible to enhance the channel estimation quality. Finally, as many channel estimation values based on the mth terminal $MS_m$ as (the number of antenna dedicated pilot signals $N_t$)×(the number of antennas $N_s(m)$ of the terminal $MS_m$) are calculated in total.

The transmission weight selection means 44 selects a maximum of $N_s(m)$ transmission beams 4 from among transmission beam candidates in each terminal $MS_m$ using the calculated channel estimation values (step S3 in FIG. 3). To select the transmission beam from among the transmission beam candidates, the base station apparatus 1 and the terminal $MS_m$ previously share predetermined transmission weight candidates $W_n$ from the base station apparatus as a base station transmission weight table, where n is a natural number equal to or less than a predetermined number $N_b$. The base station transmission weight table is a list of transmission weights in the base station apparatus 1 covering the communication area 5 in a predetermined angle range with a predetermined spatial resolution. The number of elements of the table is the number of elements of the number of base station transmission array elements $N_t$×the number of transmission weight candidates $N_b$.

Figure 5:
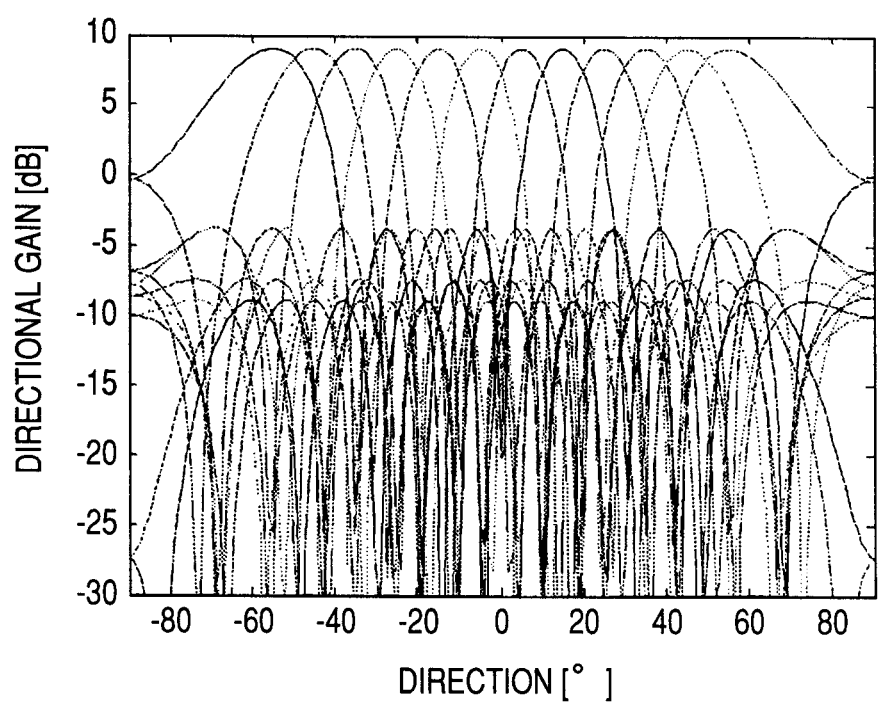
FIG. 5 A characteristic drawing to show directivity generated according to a base station transmission weight table.

FIG. 5 is a characteristic drawing of a graph indicating directivity generated according to the base station transmission weight table. FIG. 5 shows directivity when the base station apparatus has an eight-element equal spacing linear array with 0.5 wavelength spacing assuming that array elements in the base station apparatus 1 are omni-directional. In this case, the directivity is made up of transmission weight candidates for covering the communication area 5 (120° sector) every spatial resolution 10°. In addition to the method for the base station apparatus 1 and the terminal $MS_m$ to previously share the base station transmission weight table, a method may be adopted wherein the base station apparatus 1 previously reports the number of elements, the antenna element spacing, arrangement (linear or circular), the angle range of the communication area 5 [θs, θe], and angle resolution Δθ to each terminal $MS_m$ and the base station transmission weight table is generated in each terminal $MS_m$.

For example, if the array has equally spaced elements (where the number of elements is $N_t$ and the element spacing is d), a base station transmission weight table with transmission weight $W_n$ as shown in expression (3) as element can be created.

[Expression 3]

$$w_n = \begin{bmatrix} 1 \\ \exp\{j2\pi d \cdot 1 \cdot \sin\{\theta_s - (n-1)\Delta\theta\}/\lambda\} \\ \vdots \\ \exp\{j2\pi d \cdot (N-1) \cdot \sin\{\theta_s - (n-1)\Delta\theta\}/\lambda\} \end{bmatrix} \quad (3)$$

where n is a natural number equal to or less than the value resulting from dropping the fractional portion of {1+(θe−θs)/Δθ}. The information to generate the base station transmission weight table need not frequently be updated and may be updated at the same time, for example, when a new position is registered in the communication area 5 with a move of the terminal $MS_m$, etc. Accordingly, it becomes necessary for the base station apparatus 1 to send information to the mobile station apparatus, but the configuration of the base station apparatus 1 can be made flexible.

A method of previously listing information concerning the representative configuration of the array antenna in the base station apparatus 1 and reporting the list number may be adopted. FIG. 6 is a drawing of a table previously listing information concerning the array configuration in the base station apparatus 1. Information of the number of elements, the element arrangement, the element spacing, the angle range in the communication area 5, and the angle resolution indicating the main beam spacing of the transmission beam 4 is listed under the list numbers. Such a list is introduced, whereby the amount of information sent from the base station apparatus 1 to each terminal $MS_m$ can be decreased.

As another method, a method of sharing a list for giving predetermined phase rotation to each array element regardless of the array configuration may be adopted. As another method, a method of calculating an average phase difference between the channel estimation values and reporting the value or reporting the quantization value based on a predetermined value may be adopted. Accordingly, an equal gain in-phase synthetic beam can be obtained in a sight propagation environment. Although it is assumed that the base station apparatus 1 and the terminal $MS_m$ previously share predetermined transmission weight candidates $W_n$ from the base station apparatus as a base station transmission weight table, the terminal $MS_m$ may send information of the optimum transmission beam 4 to the base station apparatus. In this case, the amount of the information to be sent increases, but it is made possible to optimize the communication quality.

Transmission beam candidates are selected as follows (step S3 in FIG. 3): To select the transmission beam candidates, the operation differs depending on whether the number of the reception channels $N_s(m)$ in the mth terminal $MS_m$ is value 1 or value 2 or more. Transmission beam candidate selection methods are shown.

(α) When $N_s(m)=1$

In this case, a transmission weight with reception power reaching the maximum is selected from among the transmission weight candidates $W_n$ in the base station transmission weight table. That is, the maximum transmission weight $T_1(m)$ satisfying expression (4) is selected. Here, n is a natural number equal to or less than a predetermined number $N_b$.

[Expression 4]

$$T_m(m) = \arg\{w_n \mid \max_n(|H(m)w_n|^2)\} \quad (4)$$

(β) When $N_s(m) \geq 2$

Figure 7:
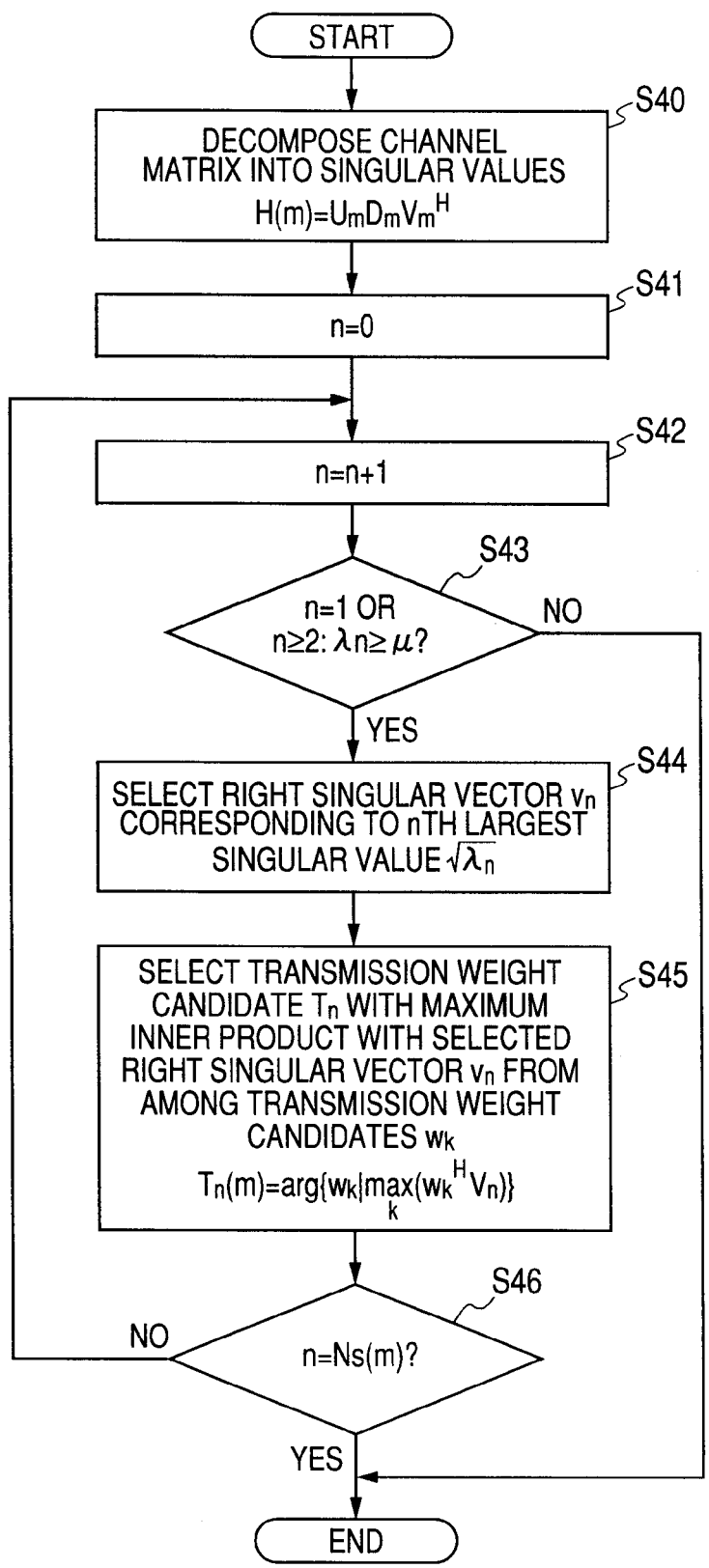
FIG. 7 A flowchart to show a transmission weight candidate selection processing procedure.

FIG. 7 is a flowchart to show the transmission weight candidate selection processing procedure. In this case, first, channel matrix H (m) obtained in the terminal $MS_m$ is decomposed into singular values as shown in expression (5) (step S40).

[Expression 5]

$$H(m) = U_m D_m V_m^H \quad (5)$$

where H is an operator indicating complex conjugate transposition, and $D_m$ is a matrix with $N_s(m)$ rows and $N_t$ columns and the singular values are arranged in principal diagonal components as shown in expression (6).

[Expression 6]

$$D_m = \begin{bmatrix} \sqrt{\lambda_1(m)} & 0 & \cdots \\ 0 & \sqrt{\lambda_2(m)} & \\ \vdots & \vdots & \ddots \end{bmatrix} \quad (6)$$

An initial value 0 is assigned to a counter n (step S41) and the counter n is incremented by one (step S42). Then, whether or not n=1 or whether or not n≧2 and the singular value is a predetermined value μ or more is determined (step S43). In this case, n=1 and therefore the determination at step S43 is YES and the column vector of the right singular value matrix corresponding to the largest singular value is selected (step S44). Further, the transmission weight candidate $W_n$ with the maximum correlation with the column vector $v_1$ of the right singular value matrix $V_m$ corresponding to the maximum singular value of the channel matrix is selected as the first transmission beam $T_1$ (step S45). Here, k is a natural number equal to or less than a predetermined number $N_b$.

[Expression 7]

$$T_n(m) = \arg\{w_k \mid \max_k(w_k^H v_n)\} \quad (7)$$

Whether or not n matches $N_s(m)$ is determined (step S46). If a match is not found, the process returns to step S42 and the counter n is incremented by one and again the transmission weight candidate selection processing is performed. On the other hand, if a match is found at step S46, the transmission weight candidate selection processing is terminated.

In the second or later loop, namely, when n≧2, whether or not the singular value is equal to or greater than a predetermined value μ is determined at step S43. If the singular value is less than the predetermined value μ, it is assumed that an effective space division multiplex channel is not obtained in the propagation environment, and the transmission weight candidate selection processing is terminated. On the other hand, if the singular value is equal to or greater than the predetermined value μ, at step S44, the column vector $v_n$ in the right singular value matrix $V_m$ corresponding to the nth largest singular value is selected and the transmission weight candidate $W_n$ with the maximum inner product with the selected right singular vector $v_n$ is selected as the nth transmission beam $T_n$ from among the transmission weight candidates $W_k$ as shown in expression (7). The predetermined value μ can be determined based on the technique of Waterfilling with information disclosed in Document: I. Telatar, "Capacity of multi-antenna Gaussian Channels," European Trans. Tel., 10 (6), 1999, p. 585-595, for example.

Next, the reception quality detection means 42 predicts and estimates the reception quality in each terminal $MS_m$ for transmission with the selected transmission beam 4 (step S4 in FIG. 3). As the reception quality, reception signal power, SIR (signal power to interference power ratio), SNR (signal power to noise power ratio), etc., can be applied. Here, the case where the SNR is used is shown. To evaluate the SNR using the antenna dedicated pilot signal $AP_k(t)$, $L_n(m)$ is calculated as the SNR when the nth transmission beam 4 in the terminal $MS_m$ as shown in expression (8).

[Expression 8]

$$L_n(m) = \frac{\lambda_n(m)[T_n^H v_n]}{N(m)} \quad (8)$$

where N(m) denotes noise power, which is calculated using expression (9).

[Expression 9]

$$N(m) = \frac{1}{N_s(m)N_t N_p} \sum_{j=1}^{N_s(m)} \sum_{k=1}^{N_t} \sum_{t=1}^{N_p} |AP_k^*(t)r_{j,k}^{(m)}(t) - h^m(j,k)|^2 \quad (9)$$

To calculate the SIR, for example, if maximum ratio synthetic beam is formed and is received in the terminal $MS_m$ to receive the transmission beam, the reception signal power to the signal transmitted by the transmission beam excluding that transmission beam is considered as the interference component.

Next, the control information generation means 45 generates control information based on output of the transmission weight selection means 44 and output of the reception quality detection means 42. The dedicated data generation section 46 outputs a signal provided by performing predetermined transmission line coding and modulation for the data signal unique to the terminal. The transmission section 47 converts the baseband signal of the transmission data series in a predetermined frame format formed based on output of the control information generation means 45 and output of the dedicated data generation section 46 into a high frequency signal subjected to band limitation processing and amplification processing and transmits the high frequency signal from the transmission antenna 48.

Thus, each terminal $MS_m$ sends a notification about $N_b(m)$ transmission beams $T_n(m)$ (where n=1 to $N_b(m)$) provided by each terminal $MS_m$ and the reception quality to the base station apparatus 1 (step S5A in FIG. 3). In this case, as the control information in the control information generation means 45, the transmission beam notification uses the number in the base station transmission weight table shared between the base station apparatus 1 and the terminal $MS_m$. Accordingly, information of only the transmission beam number needs to be transmitted and thus the information amount in making the transmission beam notification can be reduced. As for the reception quality, a reception quality table subjected to appropriate quantization can also be shared between the base station apparatus 1 and the terminal $MS_m$ for making a reception quality notification using the number in the reception quality table. Accordingly, it is made possible to reduce to the information amount of only a predetermined number of quantization bits.

As another notification method about the reception quality, a multilevel modulation coding rate table associating the multilevel modulation count and the coding rate with each other based on the measured reception quality can also be shared between the base station apparatus 1 and the terminal $MS_m$ for making a reception quality notification using the number in the multilevel modulation coding rate table. Accordingly, the information amount in making the reception quality notification can be reduced.

On the other hand, the base station apparatus 1 receives the high frequency signal transmitted from the terminal $MS_m$ at the base station antenna 20 and performs frequency conversion processing of the high frequency signal in the reception section 21 to generate a baseband signal. The control information extraction means 22 extracts the control information sent from the terminal $MS_m$ from the received baseband signal.

The terminal assignment means 23 assigns the terminal $MS_m$ to communicate considering the transmission beam notification from each terminal $MS_m$ (step S5 in FIG. 3). FIG. 8 is a flowchart to show the assignment processing procedure of the terminal $MS_m$. First, the terminal $MS_m$ to be assigned preferentially using a predetermined scheduling algorithm based on QoS information of the data to be transmitted (allowable delay, requirement rate, etc.,) and transmission quality information (step S50). Here, Maximum CIR method, Proportional fairness method, and the like of high-speed packet schedulers based on reception SIR are proposed as the scheduling algorithm. For example, information is disclosed in Document: A. Jalali, R. Padovani and R. Pankaj, "Data Throughput of CDMA-HDR a High Efficiency—High Data Rate Personal Communication Wireless System," IEEE VTC2000-Spring, May 2000, p. 1854-1858.

The transmission beam 4 is assigned using the transmission beam $T_n(m)$ making the transmission beam notification by the terminal $MS_m$ (step S51) where n is a natural number equal to or less that $N_s(m)$ at most. If a plurality of transmission beams 4 are sent, namely, if $N_s(m)>1$, different data streams are spatially multiple-transmitted (SDM).

Whether or not there is a terminal $MS_m$ making transmission beam notification with low correlation with the transmission beam 4 of the assigned terminal $MS_m$ is determined (step S52). That is, mutual interference amount I (m, l) between the terminal $MS_m$ to be newly assigned and the already assigned transmission beam is calculated based on the already assigned transmission beam $T_n(m)$ and the first terminal $MS_m$ as shown in expression (10), and whether or not the mutual interference amount I (m, l) is equal to or less than a predetermined value is determined.

[Expression 10]

$$I(m, l) = \sum_{k=1}^{Ns(l)} \sum_{n=1}^{Na} P_{nk}(m, l) |T_n(m)^H T_k(l)|^2 \qquad (10)$$

where $P_{nk}(m, l)$ is the ratio between the transmission power using the transmission beam $T_n(m)$ and the transmission power using a transmission beam $T_k(l)$, and $N_a$ represents the total number of the already assigned transmission beams 4. Here, the ratio when the smaller transmission power is the denominator is calculated to estimate the mutual interference amount.

If the mutual interference amount I (m, l) is equal to or less than the predetermined value, the corresponding terminal is adopted as an assignment candidate terminal (step S53). If two or more assignment candidate terminals exist, the terminal $MS_m$ with the maximum reception quality is assigned. After the assignment operation terminates, the process returns to step S52 and similar processing is repeated for determining the terminal $MS_m$ to be connected by way of space division multiplexing. When it is not determined at step S52 that there is a terminal $MS_m$ making transmission beam notification with low correlation, the processing is terminated.

As another method, when SDMA is executed, the upper limit number of terminals connected at the same time by way of space division multiplexing may be previously fixed. Accordingly, the throughput of the wireless communication system is degraded, but the computation amount when a search is made for the terminals $MS_m$ that can be connected at the same time by way of space division multiplexing and a delay to connection can be decreased. Since the term $T_n(m)^H \cdot T_k(l)$ in expression (10) exists only in a known predetermined combination, a method of previously creating a computation result table and selecting the terminal $MS_m$ sending the transmission beam 4 being equal to or less than a predetermined value of the mutual interference amount I (m, l) multiplied by the transmission power ratio $P_{nk}(m, l)$ can be applied. Accordingly, the computation amount when a search is made for the terminals $MS_m$ that can be connected at the same time by way of space division multiplexing and a delay to connection can be decreased.

After the terminals $MS_m$ to be connected by way of space division multiplexing are determined, the space division multiplexing information notification means 25 notifies the terminals $MS_m$ that dedicated data transmission is to be started, and to execute SDMA, sends information concerning the transmission beam 4 used in a different terminal connected at the same time by way of space division multiplexing and information concerning signal power used in the different terminal normalized in the terminal $MS_m$ (step S5A in FIG. 3). Thus, the space division multiplexing information data series generation means 28 generates control information in a predetermined format, and the multiplexing means 29 multiplexes the output data of the dedicated data transmission means 24. The transmission section 30 performs frequency conversion, band limitation processing, and amplification processing for the baseband signal output by the multiplexing means 29 to generate a high frequency signal, and transmits the high frequency signal through the base station antenna 20. The multiplexing means 29 multiplexes space division multiplexing information data series using time division multiplexing, frequency division multiplexing, code division multiplexing, etc.

The dedicated data transmission means 24 performs predetermined transmission line coding, modulation, and interleave for transmission data to one or more assigned predetermined terminals to generate transmission data series 26. The beam formation sections 27 multiply the transmission data series 26 by the transmission weight forming the transmission beam 4 previously sent, and output. If a plurality of transmission beams 4 are assigned to one terminal $MS_m$, different data streams are spatially multiple-transmitted (SDM). As another method, time space coding may be performed for the data streams and transmission may be executed using different beams. In this case, the data rate decreases, but the communication quality can be improved by the space diversity effect or the coding gain.

FIG. 9 is a drawing to show frame structures for using space division multiplexing transmission of SDMA or SDM. A frame is made up of a pilot signal 30, user control information 31, and dedicated data series 32 to each terminal $MS_m$. Two types of frame structures of the frame structure not to transmit directivity for the user control information 31 (see FIG. 9 (a)) and the frame structure to transmit directivity for the user control information 31 (see FIG. 9 (b)) can be applied to the user control information 31. The dedicated data series 32 is transmitted using different transmission directivity assigned. A different user interference cancel weight to separate and receive the dedicated data signal for each terminal $MS_m$ transmitted in a downlink from the base station apparatus 1 (step S7 in FIG. 3) in each terminal $MS_m$ is calculated based on the information (step S6 in FIG. 3), and reception processing of dedicated data different for each terminal $MS_m$ is performed (step S8 in FIG. 3).

The dedicated data reception processing of the SDM compatible terminal 2-$m$ is performed as follows: First, a high frequency signal from the base station apparatus 1 is received at the reception antenna 40. The reception section 41 converts the received high frequency signal into a baseband signal. The channel state estimation means 43 estimates a channel matrix as the channel state. The spatial demultiplexing means 49 separates and receives any desired signal from the signal spatially multiplexed and transmitted to the home terminal or a different terminal based on the output of the channel state estimation means 43. The data extraction means 50 extracts transmission data from the output signal of the spatial demultiplexing means 49 and further performs demodulation processing, deinterleave processing, and transmission line error correction coding processing to restore the transmission data. The dedicated data reception processing of the SDM incompatible terminal 3 is the same as that of the SDM terminal 2 except that the data extraction means 60 operates in a different manner from the data extraction means 50.

Next, the reception operation of the terminal $MS_m$ will be discussed in detail separately in the case where the number of the reception channels is two or more and the case where the number of the reception channels is one.

(α) When the number of the reception channels in the terminal $MS_m$ is two or more (operation of the spatial demultiplexing means 49 of the SDM compatible terminal 2)

In this case, a signal $y_m(t)$ received by the terminal $MS_m$ is represented as shown in expression (11) where t denotes the time, $y_m(t)$ is a column vector having as many elements as the number of the reception channels $N_s(m)$, $x_m(t)$ is a column vector having $N_s(m)$ elements and representing transmission data to the terminal $MS_m$, $z_{jl}(t)$ is a column vector representing transmission data to a terminal $MS_j$ except the terminal $MS$ and having $N_s(j)$ elements, and $P_{jl}$ represents signal power normalized by transmission power of the terminal $MS_m$ reported from the base station apparatus 1 and transmitted using a transmission beam $T_l(j)$ in the different terminal $MS_j$. In expression (11), the second term represents the interference component with the terminal $MS_m$. Therefore, if the weight to minimize the interference, namely, maximize the SINR is calculated according to MMSE (minimum square error criterion) criterion, interference cancel weight G(m) shown in expression (12) is obtained, where $Z_i$ is represented by expression (13).

[Expression 11]

$$y_m(t) = H(m)[T_1(m) \ldots T_{Ns(m)}]x_m(t) + H(m)\sum_{j=1}^{Nu}[P_{j1}T_1 \ldots P_{jNs(l)}T_{Ns(l)}(j)]z_{jl}(t) \quad (11)$$

[Expression 12]

$$G(m)=[Z_i Z_i^H+\sigma^2 I]^{-1}(H(m)[T_1(m) \ldots T_{Ns(m)}(m)]) \quad (12)$$

[Expression 13]

$$Z_i = \sum_{j=1}^{Nu} H(k)[P_{j1}T_1(j) \ldots P_{jNs(l)}T_{Ns(l)}(j)] \quad (13)$$

Therefore, the reception signal $y_m(t)$ is multiplied by the obtained interference cancel weight G(m) as shown in expression (14) for decreasing the interference component and then the signal is detected by maximum likelihood estimation based on information of signal constellation $s_k$ transmitted for separating and receiving spatially multiple-transmitted signal $s_m(t)$ as shown in expression (15).

[Expression 14]

$$d_m(t)=G^H(m)y_{(m)}(t) \quad (14)$$

[Expression 15]

$$s_m(t) = \arg\left\{s_k \bigg| \min_{s_k \in c^{ML}} | d_m(t) - G^H H(m)[T_1(m) \ldots T_{Ns(m)}(m)]s_k |^2 \right\} \quad (15)$$

(β) When the number of the reception channels in the terminal $MS_m$ is one (operation of the data extraction means 60 of the SDM incompatible terminal 3)

In this case, interference cancel using spatial flexibility cannot be executed in the terminal $MS_m$ and therefore the data extraction means 60 first detects the maximum interference component in the second term indicating the interference component in expression (16). That is, as shown in expression (17), if the inner product of the transmission beam 4 to different terminal $MS_m$ and the transmission beam 4 to the home terminal multiplied by the transmission power ratio becomes the maximum, it becomes the maximum interference component and therefore the maximum likelihood estimation method considering the signal constellation becoming the interference component is executed. This means that the signal is detected by maximum likelihood estimation as shown in expression (18). Deinterleave processing and transmission line error correction coding processing are performed for the detected output signal to restore the transmission data.

[Expression 16]

$$(J, L) = \arg\left\{j, l \mid \max_{j,l}(P_{jl}T_1^H(m)T_l(j))\right\} \quad (16)$$

[Expression 17]

$$y_m(t) = H(m)T_1(m)x_m(t) + \quad (17)$$
$$H(m)\sum_{j=1}[P_{j1}T_1(j) \ldots P_{jNs(l)}T_{Ns(l)}(j)]z_{jl}(t)$$
$$\approx H(m)T_1(m)x_m(t) + H(m)P_{JL}T_L(J)z_{JL}(t)$$

[Expression 18]

$$s_m(t) = \arg\min_{s_k \in C^{ML}}|y_m(t) - \{H(m)T_1(m)x_m(t) + H(m)P_{JL}T_L(J)z_{JL}(t)\}|^2 \quad (18)$$

As another method, the base station apparatus 1 may send the result found in expression (16). Accordingly, the advantage that the computation amount of the terminal $MS_m$ can be decreased can be provided. As another method, the terminal 3 may perform detection processing including an interference signal based on maximum likelihood estimation according to expression (18) only if the reception SINR of the terminal exceeds a predetermined value.

According to the operation, in the embodiment, when the transmission beam 4 required at the SDMA time is determined, the need for feeding back the channel estimation value or the transmission weight itself is eliminated and the information amount can be decreased and consequently the transmission efficiency can be enhanced. Since the transmission beam 4 is determined through feedback, a calibration circuit for removing the effect of the deviation caused by the hardware between array series becomes unnecessary in the base station apparatus 1 and the configuration of the base station apparatus 1 can be simplified and can be reduced in cost. If identical channel interference exists at the SDMA time, the terminal MSm performs the operation for decreasing the interference, so that the transmission beam 4 can be selected without impairing the array gain.

The embodiment can be applied regardless of connection oriented or packet data exchange transmission. In the embodiment, transmission power control may be added so that the reception quality in the spatial multiplexing terminal $MS_m$ becomes constant. This can be accomplished by measuring the index of SIR, etc., for example, as the reception quality in the terminal $MS_m$, sending the index to the base station apparatus 1, and controlling the transmission power from the base station apparatus 1 based on the index.

In the first embodiment, the transmission beam 4 with the maximum correlation is selected using expression (4) or (7) at the operation time of transmission weight candidate selection; however, as another method, a notification of the transmission beam 4 with the minimum correlation as shown in expression (19) or (20) may be sent to the base station apparatus 1. Accordingly, the base station apparatus 1 can eliminate the need for the operation to determine whether or not the terminal $MS_m$ making transmission beam notification with low correlation exists based on expression (10). That is, the terminal $MS_m$ selecting the transmission beam 4 with the minimum correlation sent by the terminal $MS_m$ assigned preferentially based on the specific scheduling algorithm as the transmission beam 4 is adopted as an assignment candidate, whereby search using expression (10) can be made unnecessary.

[Expression 19]

$$G_n(m) = \arg\left\{w_n \mid \min_k(|H(m)w_n|^2)\right\} \quad (19)$$

[Expression 20]

$$G_n(m) = \arg\left\{w_k \mid \min_k(w_k^H v_n)\right\} \quad (20)$$

In the procedure in FIG. 3, if the same terminal $MS_m$ is assigned again in a sufficiently short time period from assignment of transmission terminal, it is assumed that a move of the terminal $MS_m$ is sufficiently gentle and variation in the propagation environment is small and a procedure of skipping steps S1 to S4 and using the previous transmission beam request and reception quality notification result at step S4A may be applied. In this case, the procedure can be implemented by providing temporary storage means in the base station apparatus 1. Accordingly, as steps S1 to S4 are skipped, the time other than the dedicated data transmission time can be shortened and consequently the dedicated data transmission efficiency can be improved.

Second Embodiment

FIG. 10 is a chart to show a processing procedure of a base station apparatus 1 and different mth terminal $MS_m$ in a second embodiment. The processing in the second embodiment is processing wherein a part of the processing procedure shown in FIG. 3 in the first embodiment described above is changed and therefore steps identical with those in the first embodiment are denoted by the same step numbers in the second embodiment and only different processing from that in the first embodiment will be discussed. The configurations of the base station apparatus 1 and terminals 2 and 3 are the same as those in the first embodiment and therefore will not be discussed again. In the description to follow, the operation after frame synchronization and symbol synchronization are established between the base station apparatus 1 and the terminal is shown, and the synchronization establishing operation is not shown.

First, the base station apparatus 1 includes $N_t$ base station antennas 20 and transmission sections 30-1 to 30-Nt and transmits a known signal series made up of a predetermined number of symbols $N_p$ (which will be hereinafter referred to as beam dedicated pilot signal $BP_k(t)$) from each of the transmission sections using a predetermined number $N_d$ of different transmission beams $W_k$ (step S90). Here, k is the transmission beam number in the base station apparatus 1 and k=1, 2, ..., $N_d$ where t=1, ..., $N_p$.

The beam dedicated pilot signal $BP_k(t)$ is transmitted according to a similar frame structure to that of the antenna dedicated pilot signal 30 shown in the FIG. 4. This means that the frame structure is a frame structure wherein the antenna dedicated pilot signal 30 in the FIG. 4 is replaced with the beam dedicated pilot signal. The antenna dedicated pilot signal 30 and the beam dedicated pilot signal differ in that the antenna dedicated pilot signal 30 is transmitted separately from each antenna element and in the beam dedicated pilot signal, a different dedicated pilot signal is transmitted for each beam. A transmission beam 4 is provided by multiplying an antenna almost equal in directivity by a transmission weight; it can also be provided by using a plurality of antennas having different directivity. Here, the former method will be discussed using the transmission beam 4, but the embodiment can also be applied to the latter method in a similar manner.

The terminal $MS_m$ existing in a communication area 5 executes channel estimation for each beam, of the beam dedicated pilot signal $BP_k(t)$ transmitted for each base station antenna in channel state estimation means 43 using the signals received at reception antennas 40 and reception sections 41-1 to 41-$N_s$ (step S91). The mth terminal $MS_m$ existing in the communication area 5 includes $N_s(m)$ antennas and $N_s(m)$ reception channels and can execute SDM reception of a maximum of N(m) space division multiplex channels. Here, m is a natural number equal to or less than the number of terminals $N_{ms}$ existing in the communication area 5.

The mth SDM incompatible terminal 3 becomes $N_s(m)=1$, and the first SDM compatible terminal 2 becomes $N_s(1)>1$. For the kth beam dedicated pilot signal $BP_k(t)$, correlation operation between the reception result at the jth antenna and reception channel in the mth terminal $MS_m$, $r_j$, $k^{(m)}(t)$ (where j=1, ..., N(m)), and a replica of the beam dedicated pilot signal $BP_k(t)$ generated in the terminal $MS_m$ is performed, whereby the channel estimation value $h^m(j, k)$ of the propagation line is calculated as shown in expression (21)

[Expression 21]

$$h^m(j,k) = \frac{1}{Np}\sum_{t=1}^{Np} BP_k^*(t) r_{j,k}^{(m)}(t) \quad (21)$$

where * is a complex conjugate operator. The obtained channel estimation value $h^m(j, k)$ is represented as a channel matrix with j rows and k columns of elements as shown in expression (22). Here, in the SDM incompatible terminal 3, $N_s(m)=1$ and therefore channel matrix H(m) in this case becomes a row vector.

[Expression 22]

$$H(m) = \begin{bmatrix} h^m(1,1) & h^m(1,2) & \cdots & h^m(1,N_d) \\ h^m(2,1) & h^m(2,2) & \cdots & h^m(2,N_d) \\ \vdots & \vdots & \ddots & \vdots \\ h^m(N_s(m),1) & h^m(N_s(m),2) & \cdots & h^m(N_s(m),2) \end{bmatrix} \quad (22)$$

Two or more reception results of the beam dedicated pilot signal $BP_k(t)$ may be saved and averaging processing may be performed. In this case, if the move speed of the terminal is sufficiently small, the effect of noise can be decreased and it is made possible to enhance the channel estimation quality. Finally, as many channel estimation values based on the mth terminal $MS_m$ as (the number of beam dedicated pilot signals $N_d$)×(the number of antennas $N_s(m)$ of the terminal $MS_m$) are calculated in total.

In each terminal $MS_m$, transmission weight selection means 44 selects a maximum of $N_s(m)$ transmission beams 4 from among transmission beam candidates using the calculated channel estimation values (step S92). As the transmission beam candidates, the base station apparatus 1 and the terminal $MS_m$ previously share predetermined transmission weight candidates $W_k$ from the base station as a base station transmission weight table according to a similar method to that in the first embodiment, where n is a natural number equal to or less than a predetermined number $N_b$.

Although it is assumed that the base station apparatus 1 and the terminal $MS_m$ previously share predetermined transmission weight candidates $W_n$ from the base station apparatus as a base station transmission weight table, the terminal $MS_m$ may send information of the optimum transmission beam 4 to the base station apparatus. In this case, the amount of the information to be sent increases, but it is made possible to optimize the communication quality.

To select the transmission beam candidates at step S92, the operation differs depending on whether the number of the reception channels $N_s(m)$ in the mth terminal $MS_m$ is value 1 or 2 or more. Transmission beam candidate selection methods are shown.

(α) When $N_s(m)=1$

In this case, a transmission weight with reception power, SNR, SIR, or SINR in the mth terminal $MS_m$ reaching the maximum is selected from among the transmission weight candidates $W_k$ in the base station transmission weight table. To use the SNR as the selection index, transmission weight $T_1(m)=W_{k0}$ having $k=k_0$ the maximum so as to satisfy expression (23), for example, is selected. Here, k is a natural number equal to or less than a predetermined number $N_d$. $N_k(m)$ indicates reception noise power in the kth transmission weight candidate $W_k$ and is calculated according to expression (24).

[Expression 23]

$$k0 = \arg\left\{ k \,\middle|\, \max_{k=1,\ldots,Nd}\left[\frac{|h^m(1,k)|^2}{N_k(m)}\right]\right\} \quad (23)$$

[Expression 24]

$$N_k(m) = \frac{1}{Np}\sum_{t=1}^{Np}|BP_k^*(t)r_{j,k}^{(m)}(t) - h^m(1,k)|^2 \quad (24)$$

(β) When Ns(m)≧2

In this case, a transmission weight with reception power, SNR, SIR, or SINR in the mth terminal $MS_m$ reaching the maximum is selected from among the transmission weight candidates $W_k$ in the base station transmission weight table. To use the SNR obtained according to the transmission beam for performing maximum ratio combining in the mth terminal $MS_m$ as the selection index, evaluation function $f_m(W_k)$ satisfying expression (25), for example, is used. High-order $N_s(m)$ transmission weights $T_n(m)$ of evaluation values exceeding a predetermined value according to the evaluation function $f_m(W_k)$ are selected. Here, n is a natural number equal to or less than a predetermined number $N_s$.

[Expression 25]

$$f_m(W_k) = \sum_{j=1}^{Ns(m)} |h^m(j,k)|^2 \qquad (25)$$

Next, in each terminal $MS_m$, reception quality detection means 42 predicts and estimates the reception quality for transmission with the selected transmission beam 4 (step S93). As the reception quality, the SNR obtained according to the transmission beam for performing maximum ratio combining that can be given according to expression (25) may be used. Alternatively, dispersion of interference noise power obtained according to the transmission beam for performing maximum ratio combining is estimated, whereby the SIR or the SINR may be applied.

Next, control information generation means 45 generates control information based on output of the transmission weight selection means 44 and output of the reception quality detection means 42. Dedicated data generation section 46 outputs a signal provided by performing predetermined transmission line coding and modulation for the data signal unique to the terminal. Transmission section 47 converts the baseband signal of the transmission data series in a predetermined frame format formed based on output of the control information generation means 45 and output of the dedicated data generation section 46 into a high frequency signal subjected to band limitation processing and amplification processing and transmits the high frequency signal from a transmission antenna 48.

Thus, each terminal $MS_m$ sends a notification about $N_b(m)$ transmission beams $T_n(m)$ (where n=1 to $N_b(m)$) provided by each terminal $MS_m$ and the reception quality to the base station apparatus 1 (step S94). In this case, as the control information in the control information generation means 45, the transmission beam notification uses the number in the base station transmission weight table shared between the base station apparatus 1 and the terminal $MS_m$. Accordingly, information of only the transmission beam number needs to be transmitted and thus the information amount in making the transmission beam notification can be reduced.

As for the reception quality, a reception quality table subjected to appropriate quantization can also be shared between the base station apparatus 1 and the terminal $MS_m$ for making a reception quality notification using the number in the reception quality table. Accordingly, the information amount can be reduced to the information amount of only a predetermined number of quantization bits.

As another notification method about the reception quality, a multilevel modulation coding rate table associating the multilevel modulation count and the coding rate with each other based on the measured reception quality can also be shared between the base station apparatus 1 and the terminal $MS_m$ for making a reception quality notification using the number in the multilevel modulation coding rate table. Accordingly, the information amount in making the reception quality notification can be reduced.

The base station apparatus 1 receives the high frequency signal transmitted from the terminal $MS_m$ at the base station antenna 20 and performs frequency conversion processing of the high frequency signal in a reception section 21 to generate a baseband signal. Control information extraction means 22 extracts the control information sent from the terminal $MS_m$ from the received baseband signal.

Terminal assignment means 23 assigns the terminal $MS_m$ to communicate considering the transmission beam notification from each terminal $MS_m$ (step S95). The assignment processing of the terminal $MS_m$ is similar to that in the first embodiment described above.

After the terminals $MS_m$ to be connected are determined, the space division multiplexing information notification means 25 notifies the terminals $MS_m$ that dedicated data transmission is to be started, and to execute SDMA, sends information concerning the transmission beam 4 used in a different terminal $MS_m$ connected at the same time by way of space division multiplexing and information concerning signal power use in the different terminal $MS_m$ normalized in the terminal $MS_m$ (step S96). Thus, space division multiplexing information data series generation means 28 generates control information in a predetermined format, and multiplexing means 29 multiplexes the output data of dedicated data transmission means 24. The transmission section 30 performs frequency conversion, band limitation processing, and amplification processing for the baseband signal output by the multiplexing means 29 to generate a high frequency signal, and transmits the high frequency signal through the base station antenna 20. The multiplexing means 29 multiplexes space division multiplexing information data series using time division multiplexing, frequency division multiplexing, code division multiplexing, etc.

The dedicated data transmission means 24 performs predetermined transmission line coding, modulation, and interleave for transmission data to one or more assigned predetermined terminals to generate transmission data series 26. Beam formation sections 27 multiply the transmission data series 26 by the transmission weight forming the transmission beam 4 previously sent, and output. If a plurality of transmission beams 4 are assigned to one terminal $MS_m$, different data streams are spatially multiple-transmitted (SDM). As another method, time space coding may be performed for the data streams and transmission may be executed using different beams. In this case, the data rate decreases, but the communication quality can be improved by the space diversity effect or the coding gain.

As shown in the first embodiment described above, FIG. 9 shows the frame structures for using space division multiplexing transmission of SDMA or SDM. The frame is made up of a pilot signal 30, user control information 31, and dedicated data series 32 to each terminal $MS_m$. Two types of frame structures of the frame structure not to transmit directivity for the user control information 31 (see FIG. 9 (a)) and the frame structure to transmit directivity for the user control information 31 (see FIG. 9 (b)) can be applied to the user control information 31. The dedicated data series 32 is transmitted using different transmission directivity assigned.

A different user interference cancel weight to separate and receive the dedicated data signal for each terminal $MS_m$ transmitted in a downlink from the base station apparatus 1 in each terminal $MS_m$ is calculated based on the information (step S97) and when beam transmission of dedicated data is performed (step S98), reception processing of dedicated data different for each mobile terminal $MS_m$ is performed (step S99)

The dedicated data reception processing of the SDM compatible terminal 2-$m$ is performed as follows: First, a high frequency signal from the base station apparatus 1 is received at the reception antenna 40. The reception section 41 converts the received high frequency signal into a baseband signal. The channel state estimation means 43 estimates a channel matrix as the channel state. Spatial demultiplexing means 49 separates and receives any desired signal from the signal spatially multiplexed and transmitted to the home terminal or a different terminal based on the output of the channel state estimation means 43. Data extraction means 50 extracts transmission data from the output signal of the spatial demultiplexing means 49 and further performs demodulation processing, deinterleave processing, and transmission line error correction coding processing to restore the transmission data. The dedicated data reception processing of the SDM incompatible terminal 3 is the same as that of the SDM terminal 2 except that data extraction means 60 operates in a different manner from the data extraction means 50.

Next, the reception operation of the terminal $MS_m$ will be discussed in detail separately in the case where the number of the reception channels is two or more and the case where the number of the reception channels is one.

($\alpha$) When the number of the reception channels in the terminal $MS_m$ is two or more (operation of the spatial demultiplexing means 49 of the SDM compatible terminal 2)

In this case, a signal $y_m(t)$ received by the terminal $MS_m$ is represented as shown in expression (26) where $t$ denotes the time, $y_m(t)$ is a column vector having as many elements as the number of the reception channels $N_s(m)$, $x_m(t)$ is a column vector having $N_s(m)$ elements and representing transmission data to the terminal $MS_m$, $z_{ji}(t)$ is a column vector representing transmission data to a terminal $MS_j$ except the terminal $MS_m$ and having $N_s(j)$ elements, $P_{ji}$ represents signal power normalized by transmission power of the terminal $MS_m$ reported from the base station apparatus 1 and transmitted using a transmission beam $T_i(j)$ in the different terminal $MS_j$, and $h_m(T_n(m))$ denotes a channel response vector at the transmission time with the selected transmission weight $T_n(m)$ in the channel matrix shown in expression (22) and indicates a row vector at the time of the transmission beam corresponding to $T_n(m)$ in channel matrix H.

In expression (26), the second term indicates the interference component with the terminal $MS_m$. Therefore, if the weight to minimize the interference, namely, maximize the SINR is calculated according to MMSE (minimum square error criterion) criterion, interference cancel weight G(m) in expression (27) is obtained, where $Z_i$ is represented by expression (28).

Therefore, the reception signal $y_m(t)$ is multiplied by the obtained interference cancel weight G(m) as shown in expression (14) for decreasing the interference component and then the signal is detected by maximum likelihood estimation based on information of signal constellation $s_k$ transmitted for separating and receiving spatially multiple-transmitted signal $s_m(t)$ as shown in expression (15).

($\beta$) When the number of the reception channels in the terminal $MS_m$ is one (operation of the data extraction means 60 of the SDM incompatible terminal 3)

In this case, interference cancel using spatial flexibility cannot be executed in the terminal $MS_m$ and therefore the data extraction means 60 first detects the maximum interference component in the second term indicating the interference component in expression (26). That is, as shown in expression (29), if the inner product of the transmission beam 4 to different terminal $MS_m$ and the transmission beam 4 to the home terminal $MS_m$ multiplied by the transmission power ratio becomes the maximum, it becomes the maximum interference component and therefore the maximum likelihood estimation method considering the signal constellation becoming the interference component is executed. That is, the signal is detected by maximum likelihood estimation as shown in expression (30). Deinterleave processing and transmission line error correction coding processing are performed for the detected output signal to restore the transmission data.

As another method, the base station apparatus 1 may send the result found according to expression (29). Accordingly, the advantage that the computation amount of the terminal $MS_m$ can be decreased can be provided. As another method, the terminal 3 may perform detection processing including an interference signal based on maximum likelihood estimation according to expression (30) only if the reception SINR exceeds a predetermined value in the terminal 3.

[Expression 29]

$$(J, L) = \underset{j,l}{\mathrm{argmax}}\{P_{jl} T_1^H(m) T_l(j)\} \quad (29)$$

[Expression 30]

$$y_m(t) = h_m(T_1(m))x_m(t) + \sum_{j=1}^{Nu}[P_{j1}h_m(T_1(j))\ldots P_{jNs(l)}h_m(T_{Ns(l)}(j))]z_{ji}(t) \quad (30)$$
$$\approx h_m(T_1(m))x_m(t)\_P_{JL}h_m(T_L(J)z_{JL}(t))$$

[Expression 31]

$$s_m(t) = \arg\min_{S_k \subset C^{M^L}} |y_m(t) - \{h_m(T_1(m))x_m(t) + P_{JL}h_m(T_L(J))z_{JL}(t)\}|^2 \quad (31)$$

[Expression 26]

$$y_m(t) = [h_m(T_1(m))\ldots h_m(T_{Ns(m)}(m))]x_m(t) + \quad (26)$$
$$\sum_{j=1}^{Nu}[P_{j1}h_m(T_1(j))\ldots P_{jNs(l)}h_m(T_{Ns(l)}(j))]x_{ji}(t)$$

[Expression 27]

$$G(m) = [Z_i Z_i^H + \sigma^2 I]^{-1}(h_m(T_1(m))\ldots h_m(T_{Ns(m)}(m))) \quad (27)$$

[Expression 28]

$$Z_i = \sum_{j=1}^{Nu}[P_{j1}h_m(T_1(j))\ldots P_{jNs(l)}h_m(T_{Ns(l)}(j))] \quad (28)$$

Thus, in the second embodiment, if the beam dedicated pilot signal is transmitted for each of the different transmission beams, when the transmission beam 4 required at the SDMA time is determined, the need for feeding back the channel estimation value or the transmission weight itself is also eliminated and the information amount can also be decreased. Since the transmission beam 4 is determined through feedback, a calibration circuit for removing the effect of the deviation caused by the hardware between array series made up of a plurality of base station antennas 20 becomes unnecessary in the base station apparatus 1 and the configuration of the base station apparatus 1 can be simplified and can be reduced in cost. If identical channel interference exists at the SDMA time, the terminal $MS_m$ performs the operation for decreasing the interference, so that the transmission beam 4 can be selected without impairing the array gain.

The second embodiment can be applied regardless of connection oriented or packet data exchange transmission. In the second embodiment, transmission power control may be added so that the reception quality in the spatial multiplexing terminal $MS_m$ becomes constant. This can be accomplished by measuring the index of SIR, etc., for example, as the reception quality in the terminal $MS_m$, sending the index to the base station apparatus 1, and controlling the transmission power from the base station apparatus 1 based on the index.

In the second embodiment, the transmission beam 4 with the maximum correlation is selected using expression (23) or (25) at the operation time of transmission weight candidate selection; however, as another method, a notification of the transmission beam 4 with the minimum correlation as shown in expression (32) or (33) may be sent to the base station apparatus 1. Accordingly, the base station apparatus 1 can eliminate the need for the operation to determine whether or not the terminal $MS_m$ making transmission beam notification with low correlation exists based on expression (11). That is, the terminal $MS_m$ selecting the transmission beam 4 with the minimum correlation sent by the terminal $MS_m$ assigned preferentially based on the specific scheduling algorithm as the transmission beam 4 is adopted as an assignment candidate, whereby search using expression (10) can be made unnecessary.

[Expression 32]

$$G_n(m) = \arg\left\{ w_k \mid \min_{k=1,\ldots,Nd}\left[\frac{|h^m(1,k)|^2}{N_k(m)}\right]\right\} \quad (32)$$

[Expression 33]

$$G_n(m) = \arg\left\{ w_k \mid \min_{k=1,\ldots,Nd} f_m(W_k)\right\} \quad (33)$$

In the procedure in FIG. 10, if the same terminal $MS_m$ is assigned again in a sufficiently short time period from assignment of transmission terminal, it is assumed that a move of the terminal $MS_m$ is sufficiently gentle and variation in the propagation environment is small and a procedure of skipping steps S90 to S94 and using the previous transmission beam request and reception quality notification result at step 94 may be applied. In this case, the procedure can be implemented by providing temporary storage means in the base station apparatus 1. Accordingly, as steps S90 to S94 are skipped, the time other than the dedicated data transmission time can be shortened and consequently the dedicated data transmission efficiency can be improved.

Third Embodiment

Figure 11:
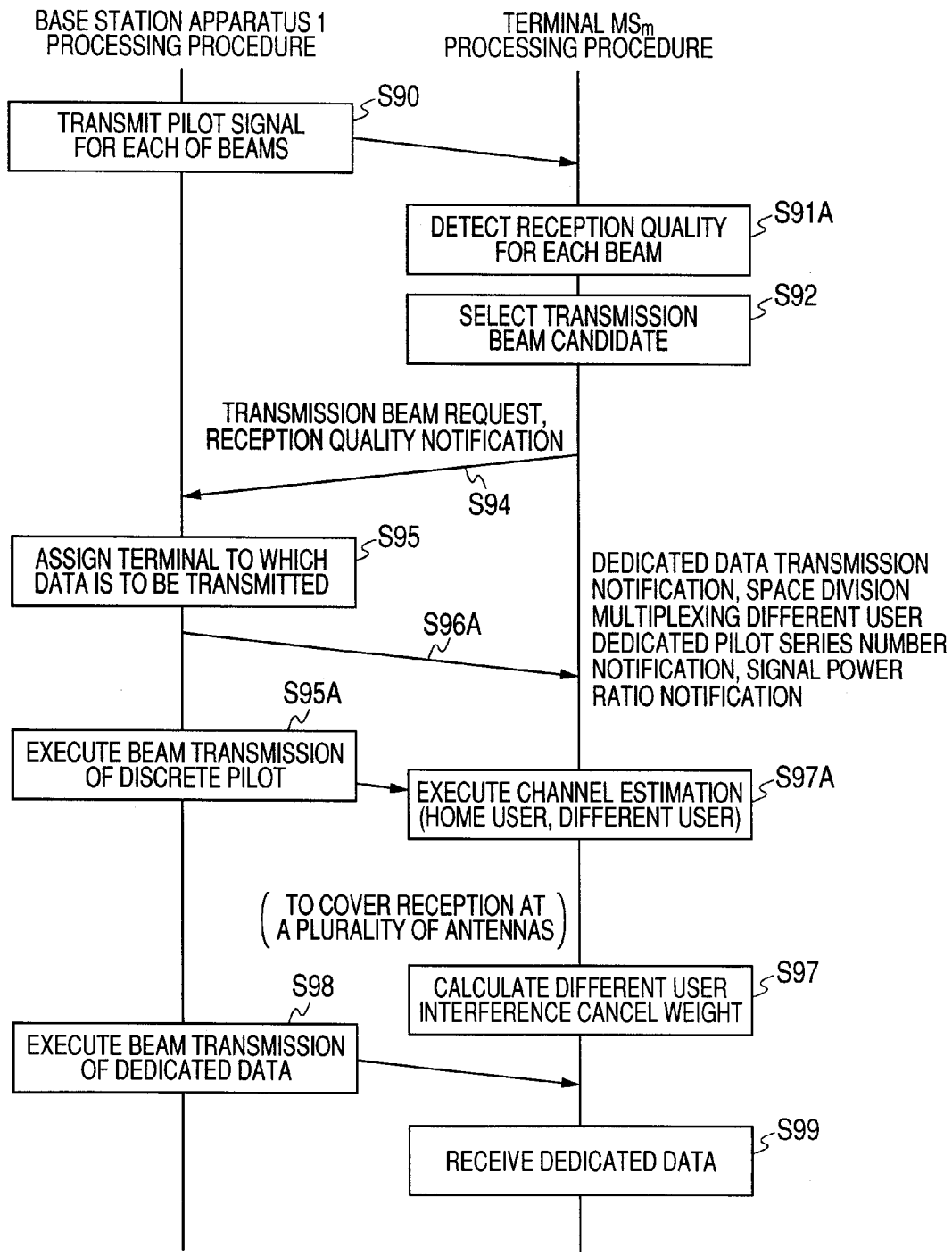
FIG. 11 A chart to show a processing procedure of a base station apparatus and different mth terminal in a third embodiment.

FIG. 11 is a chart to show a processing procedure of a base station apparatus 1 and different mth terminal $MS_m$ in a third embodiment. The processing in the third embodiment is processing wherein a part of the processing procedure shown in FIG. 10 in the second embodiment described above is changed and therefore steps identical with those in the second embodiment are denoted by the same step numbers in the third embodiment and only different processing from that in the second embodiment will be discussed. The processing in the third processing differs from that in the second embodiment mainly in two points. As one different point, although the channel estimation value for each beam is calculated at step S91 in the second embodiment, reception power is easily estimated as the reception quality for each transmission beam in the mth terminal $MS_m$ (step S91A) and $N_s(m)$ transmission beams 4 giving high-order transmission power are requested (step S92).

As another different point, after the terminal $MS_m$ to which data is to be transmitted is assigned (step S95), in space division multiplexing different user transmission weight notification at the time of dedicated data transmission notification, signal power ratio notification, and space division multiplexing different user transmission weight notification, a notification of the series number of the discrete pilot signal addressed to a different user is sent at the beam transmission time of the user dedicated pilot signal transmitted from a pilot series signal different for each user (for each terminal) (step S96A).

Based on the sent information, in the terminal MS, channel estimation of the home user and different user is executed for the beam transmission signal of the user dedicated pilot signal transmitted from the base station (step S95A), whereby a channel estimation vector according to the transmission beam 4 addressed to the home user space division multiplexed corresponding to the first term in expression (26) and a channel estimation vector addressed to different user corresponding to the second term in expression (26), $h_m(T_n(m))$ are calculated (step S97A). After this, a different user interference cancel weight is calculated (step S97) and when beam transmission of dedicated data is performed in the base station apparatus 1 (step S98), reception of dedicated data in the terminal $MS_m$ is executed (step S99). The processing is similar to that in the first embodiment.

Thus, in the third embodiment, reception power is easily estimated as the reception quality for each transmission beam in the mth terminal $MS_m$ and $N_s(m)$ transmission beams 4 giving high-order transmission power are requested, whereby the computation amount in the terminal $MS_m$ can be decreased. Since the need for calculating precise phase information is eliminated, the series length of the pilot signal for each beam transmitted at step S90 can be shortened.

In the procedure in FIG. 11, if the same terminal $MS_m$ is assigned again in a sufficiently short time period from assignment of transmission terminal, it is assumed that a move of the terminal $MS_m$ is sufficiently gentle and variation in the propagation environment is small and a procedure of skipping steps S90 to S94 and using the previous transmission beam request and reception quality notification result at step S94 may be applied. In this case, the procedure can be implemented by providing temporary storage means in the base station apparatus 1. Accordingly, as steps S90 to S94 are skipped, the time other than the dedicated data transmission time can be shortened and consequently the dedicated data transmission efficiency can be improved.

As described above, according to the embodiment, when wireless communications based on SDMA are conducted, the base station apparatus sends transmission information concerning other space division multiplexed users to each space division multiplexed terminal, whereby it is made possible to remove the different user interference signal in the terminal. Consequently, when the base station apparatus transmits a directional beam, it is made possible to form a transmission beam to allow interference between different terminals, so that the spatial flexibility in the transmission array antenna can be used to improve the communication quality. Therefore, the transmission array gain can be improved and the system capacity of the downlink can be improved. The transmission beam from the base station apparatus is a predetermined multibeam and the terminal and the base station apparatus share the base station transmission weight table, whereby control of transmission directivity through feedback information with the feedback information amount reduced can be performed and the calibration circuit in the base station apparatus can be made unnecessary. Therefore, the configuration of the base station apparatus can be simplified and the base station apparatus at low cost can be provided. If the space division multiplexed terminal encounters a terminal capable of space division multiplexing (SDM), a plurality of transmission beam weights are assigned in response to the propagation environment, whereby it is made possible to execute SDMA while executing SDM. Therefore, in the wireless communication system of the embodiment, the flexibility of transmission beam formation is increased and it is made possible to improve the reception quality and the system capacity. At this time, the feedback amount in the wireless communication system can be reduced, the calibration circuit can be made unnecessary, and the SDMA technology can be applied without impairing the array gain.

While the invention has been described in detail with reference to the specific embodiments, it will be obvious to those skilled in the art that various changes and modifications can be made without departing from the spirit and the scope of the invention.

The present application is based on Japanese Patent Application (No. 2004-150137) filed on May 20, 2004 and Japanese Patent Application (No. 2005-092544) filed on Mar. 28, 2005, which are incorporated herein by reference.

INDUSTRIAL APPLICABILITY

The invention has the advantage that when wireless communications are conducted using space division multiple access, the terminal can remove the transmission signal to a space division multiplexed different terminal, an interference signal, and consequently interference between the transmission beams to the different terminals is allowed, whereby beam formation contributing to improvement of the communication quality of the array gain, etc., is made possible and improvement of the system capacity is made possible; the invention is useful for a wireless communication system, a wireless communication method, a base station apparatus, a terminal, and the like for conducting wireless communications using space division multiple access.

The invention claimed is:

1. A base station apparatus for transmitting data to a plurality of users with a Multi-user MIMO scheme, the base station apparatus comprising:
a control information generator that generates control information, the control information including a pilot notification that is associated with a number of a second pilot signal; and
a transmitter that transmits the control information to a first user and transmits a transmission signal to the first user, the transmission signal including a first pilot signal and the second pilot signal,
wherein:
the first pilot signal is dedicated to the first user and is used for channel estimation by the first user,
the second pilot signal is dedicated to a second user and is used for interference estimation by the first user, and
the first user and the second user are different.

2. The base station apparatus according to claim 1, the interference estimation is performed by the first user based on a number of multiplexed signals included in the transmission signal.

3. The base station apparatus according to claim 1, wherein the control information further includes information on a modulation scheme.

4. The base station apparatus according to claim 1, wherein the control information includes information on a data signal, which is dedicated to a second user and which is multiplexed with a data signal dedicated to the first user.

5. A transmission method performed by a base station apparatus for communicating data to a plurality of users with a Multi-user MIMO scheme, the transmission method comprising:
generating control information including a pilot notification that is associated with a number of a second pilot signal;
transmitting the control information to a first user; and
transmitting a transmission signal to the first user, the transmission signal including a first pilot signal and the second pilot signal,
wherein:
the first pilot signal is dedicated to the first user and is used for channel estimation by the first user,
the second pilot signal is dedicated to a second user and is used for interference estimation by the first user, and
the first user and the second user are different.

6. A user terminal receiving with a Multi-user MIMO scheme, the user terminal comprising:
a receiver that receives control information transmitted from a base station apparatus, the control information including a pilot notification that is associated with a number of a second pilot signal, and that receives a transmission signal transmitted from the base station apparatus and addressed to the user terminal, the transmission signal including a first pilot signal and the second pilot signal, wherein the first pilot signal is dedicated to the user terminal, and the second pilot signal is dedicated to a second user terminal that is different from the user terminal, and
an estimator that performs a channel estimation calculation using the first pilot signal, and that performs an interference estimation calculation using the second pilot signal.

7. A reception method performed by a user terminal in a Multi-user MIMO scheme, the reception method comprising:
receiving control information transmitted from a base station apparatus, the control information including a pilot notification that is associated with a number of a second pilot signal;
receiving a transmission signal transmitted from a base station apparatus and addressed to the user terminal, the transmission signal including a first pilot signal and the second pilot signal, wherein the first pilot signal is dedicated to the user terminal, and the second pilot signal is dedicated to a second user terminal that is different from the user terminal;
performing a channel estimation calculation using the first pilot signal;
performing an interference estimation calculation using the second pilot signal.

* * * * *